US012675775B2

(12) United States Patent
Munnaza

(10) Patent No.: US 12,675,775 B2
(45) Date of Patent: Jul. 7, 2026

(54) TECHNOLOGY FOR AUTOMATED EVENT SCHEDULING

(71) Applicant: Truist Bank, Charlotte, NC (US)

(72) Inventor: Ayesha Munnaza, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/771,204

(22) Filed: Jul. 12, 2024

(65) Prior Publication Data

US 2026/0017618 A1 Jan. 15, 2026

(51) Int. Cl.
 *G06Q 10/1093* (2023.01)
 *G01S 19/01* (2010.01)
(52) U.S. Cl.
 CPC .......... *G06Q 10/1093* (2013.01); *G01S 19/01* (2013.01)
(58) Field of Classification Search
 CPC ............................ G06Q 10/1093; G01S 19/01
 See application file for complete search history.

(56) References Cited

U.S. PATENT DOCUMENTS

| | | | | |
|---|---|---|---|---|
| 2021/0110352 A1* | 4/2021 | Dunne | ................... | G06Q 50/01 |
| 2022/0417699 A1* | 12/2022 | Vakkachen | ........... | H04W 4/021 |
| 2023/0374746 A1* | 11/2023 | High | .................. | G06Q 10/0631 |
| 2024/0086859 A1* | 3/2024 | Gillam | ............... | G06Q 10/1097 |
| 2025/0045633 A1* | 2/2025 | Behrostaghi | ........... | G06N 20/00 |

OTHER PUBLICATIONS

Yang Song, Friendship influence on mobile behavior of location based social network users, 2015, p. 126-127 (Year: 2015).*

* cited by examiner

*Primary Examiner* — Ibrahim N El-Bathy
(74) *Attorney, Agent, or Firm* — Jordan IP Law LLC; Michael A. Springs, Esq.

(57) ABSTRACT

An enterprise computer server system, a computer program product, and a computer-implemented method to automate event scheduling based on geographic location data and profile data of a target population group (TPG).

20 Claims, 14 Drawing Sheets

Enterprise Database(s) 400

Enterprise Client Device 100

NETWORK 300

200 Enterprise Server Computing System 500 3rd Party Database(s)

Enterprise
Database(s)

400

100

Enterprise Client
Device

NETWORK

300

200

Enterprise Server
Computing System

500

3<sup>rd</sup> Party
Database(s)

600

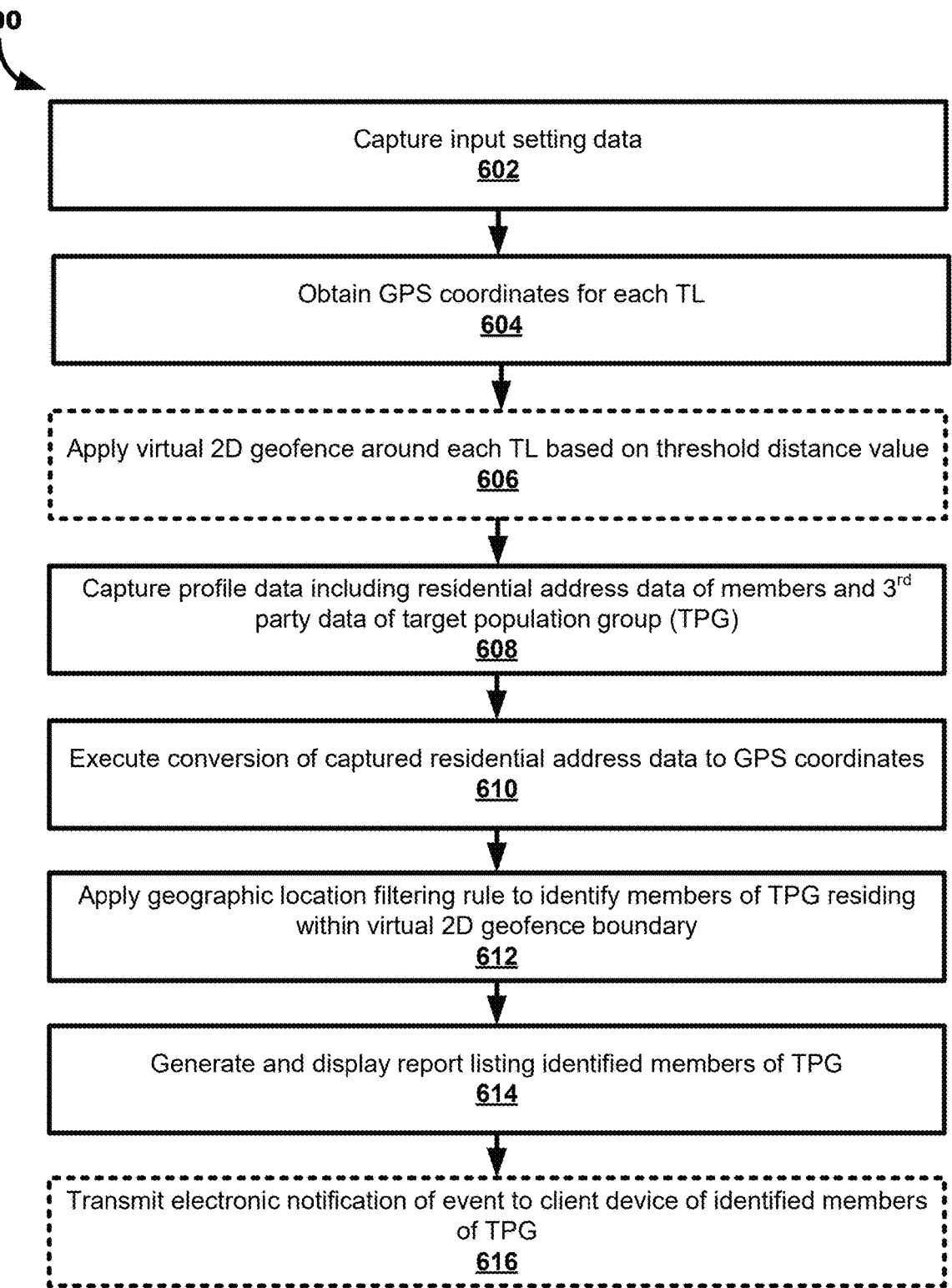

Capture input setting data
602

Obtain GPS coordinates for each TL
604

Apply virtual 2D geofence around each TL based on threshold distance value
606

Capture profile data including residential address data of members and 3rd party data of target population group (TPG)
608

Execute conversion of captured residential address data to GPS coordinates
610

Apply geographic location filtering rule to identify members of TPG residing within virtual 2D geofence boundary
612

Generate and display report listing identified members of TPG
614

Transmit electronic notification of event to client device of identified members of TPG
616

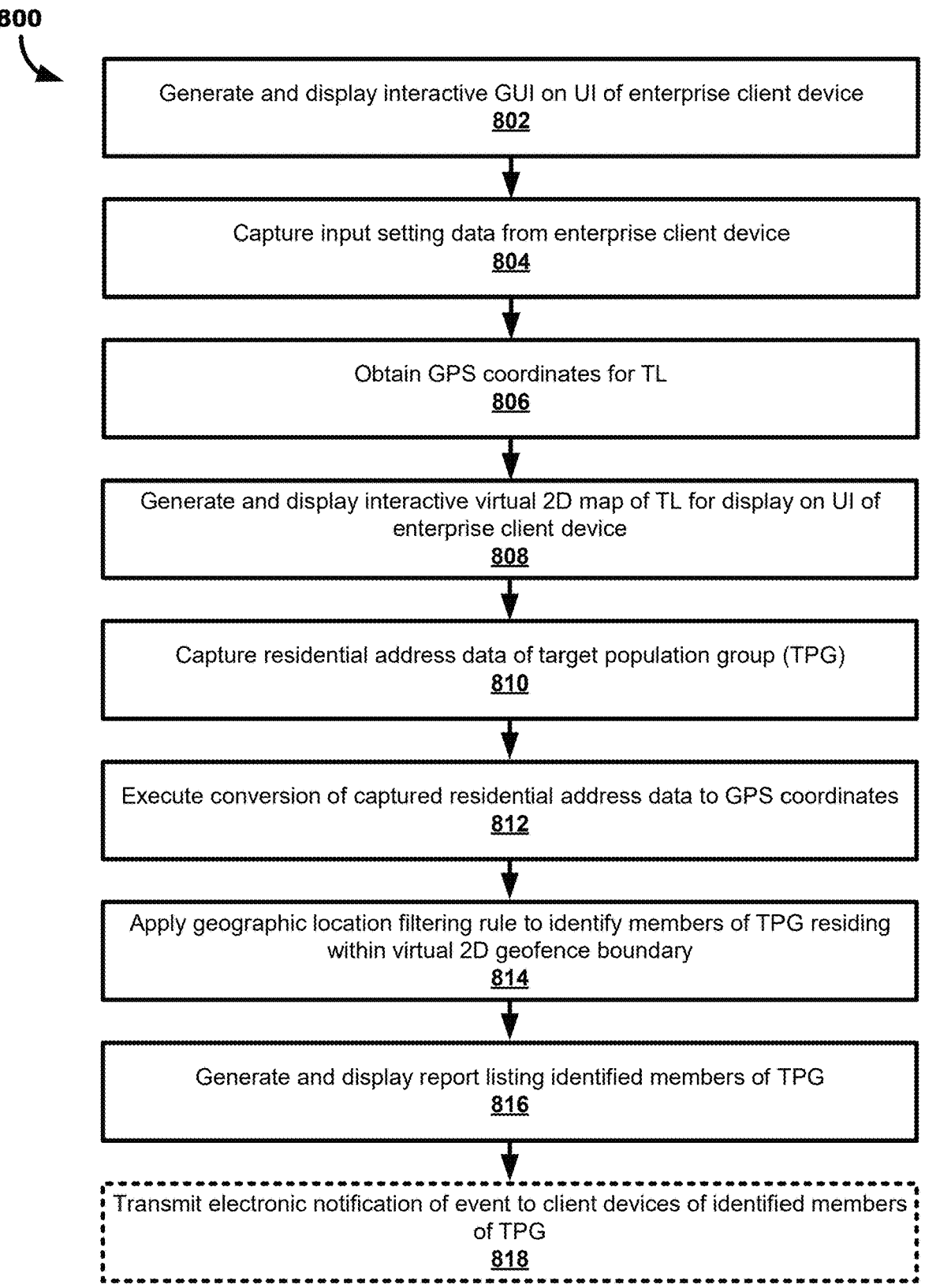

Generate and display interactive GUI on UI of enterprise client device
802

Capture input setting data from enterprise client device
804

Obtain GPS coordinates for TL
806

Generate and display interactive virtual 2D map of TL for display on UI of enterprise client device
808

Capture residential address data of target population group (TPG)
810

Execute conversion of captured residential address data to GPS coordinates
812

Apply geographic location filtering rule to identify members of TPG residing within virtual 2D geofence boundary
814

Generate and display report listing identified members of TPG
816

Transmit electronic notification of event to client devices of identified members of TPG
818

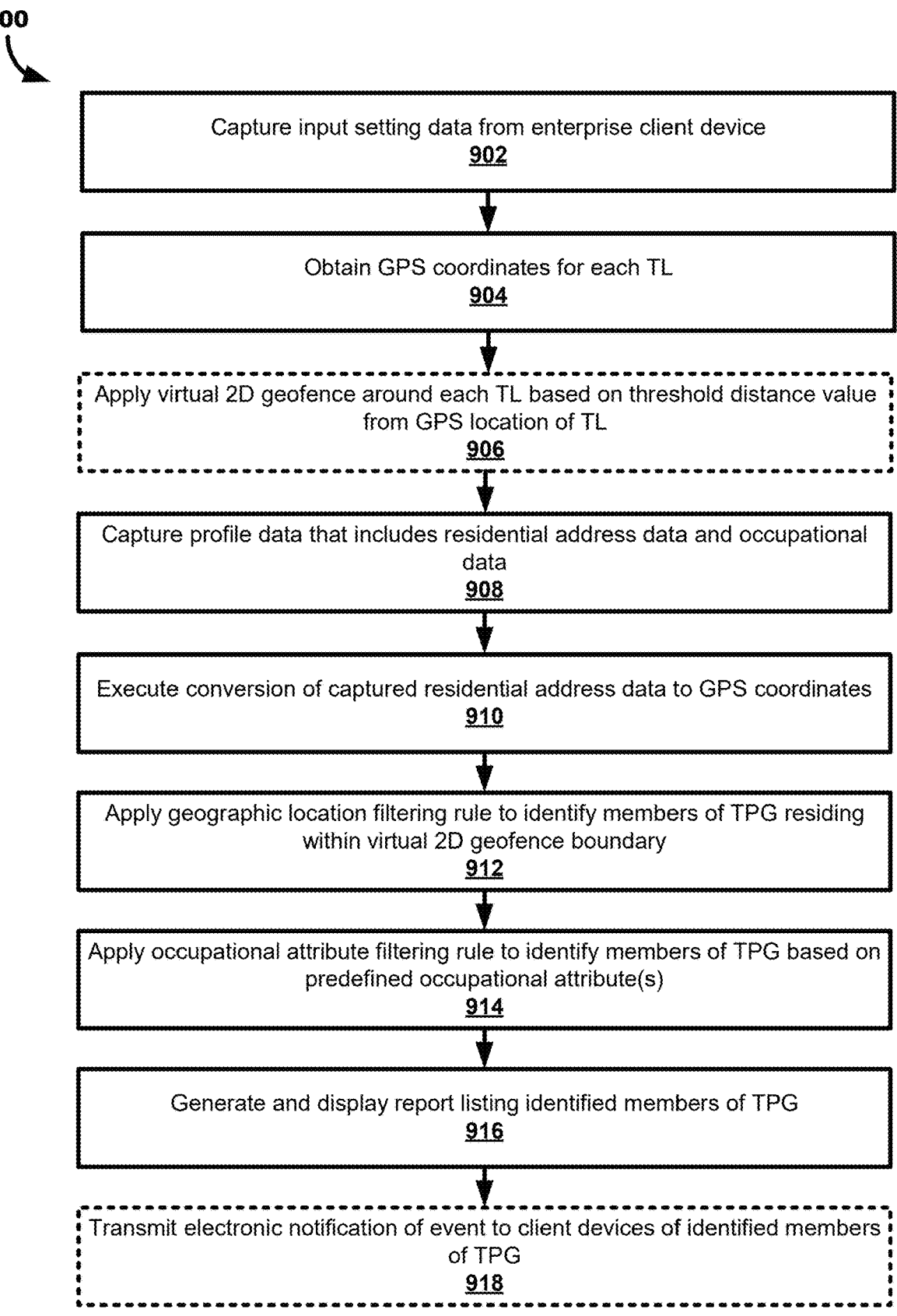

Capture input setting data from enterprise client device
902

Obtain GPS coordinates for each TL
904

Apply virtual 2D geofence around each TL based on threshold distance value from GPS location of TL
906

Capture profile data that includes residential address data and occupational data
908

Execute conversion of captured residential address data to GPS coordinates
910

Apply geographic location filtering rule to identify members of TPG residing within virtual 2D geofence boundary
912

Apply occupational attribute filtering rule to identify members of TPG based on predefined occupational attribute(s)
914

Generate and display report listing identified members of TPG
916

Transmit electronic notification of event to client devices of identified members of TPG
918

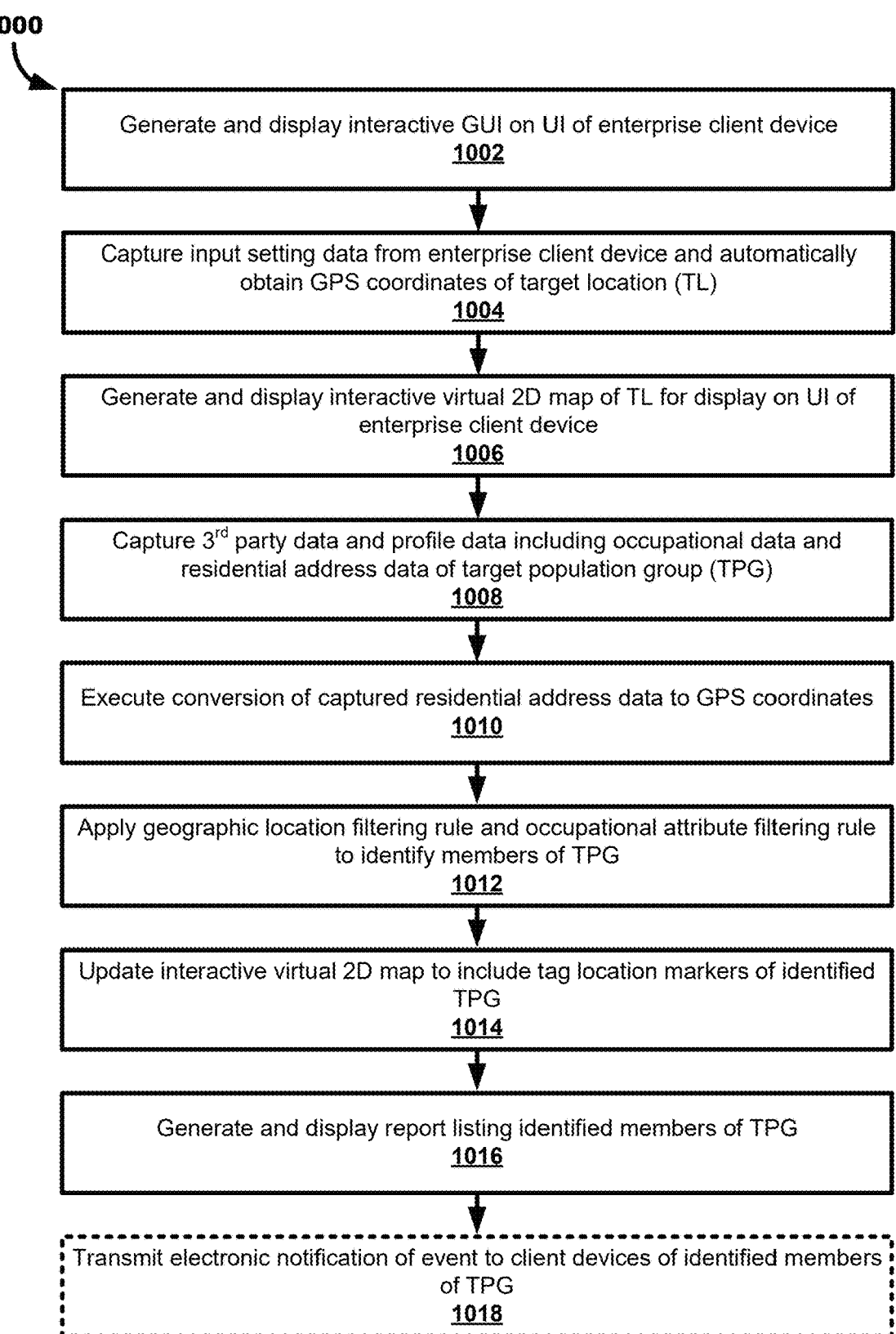

Generate and display interactive GUI on UI of enterprise client device
1002

Capture input setting data from enterprise client device and automatically obtain GPS coordinates of target location (TL)
1004

Generate and display interactive virtual 2D map of TL for display on UI of enterprise client device
1006

Capture 3<sup>rd</sup> party data and profile data including occupational data and residential address data of target population group (TPG)
1008

Execute conversion of captured residential address data to GPS coordinates
1010

Apply geographic location filtering rule and occupational attribute filtering rule to identify members of TPG
1012

Update interactive virtual 2D map to include tag location markers of identified TPG
1014

Generate and display report listing identified members of TPG
1016

Transmit electronic notification of event to client devices of identified members of TPG
1018

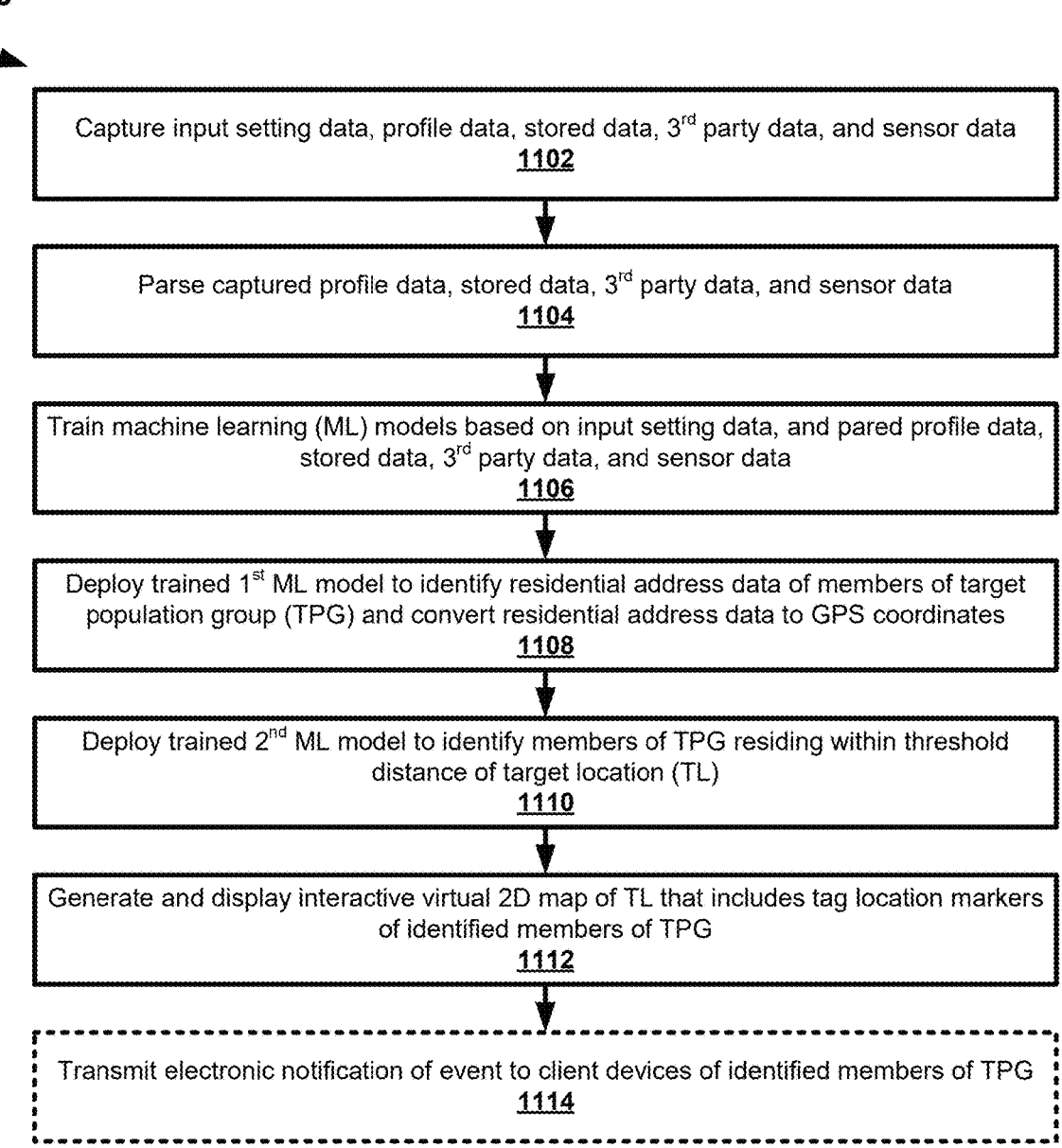

Capture input setting data, profile data, stored data, 3rd party data, and sensor data
1102

Parse captured profile data, stored data, 3rd party data, and sensor data
1104

Train machine learning (ML) models based on input setting data, and pared profile data, stored data, 3rd party data, and sensor data
1106

Deploy trained 1st ML model to identify residential address data of members of target population group (TPG) and convert residential address data to GPS coordinates
1108

Deploy trained 2nd ML model to identify members of TPG residing within threshold distance of target location (TL)
1110

Generate and display interactive virtual 2D map of TL that includes tag location markers of identified members of TPG
1112

Transmit electronic notification of event to client devices of identified members of TPG
1114

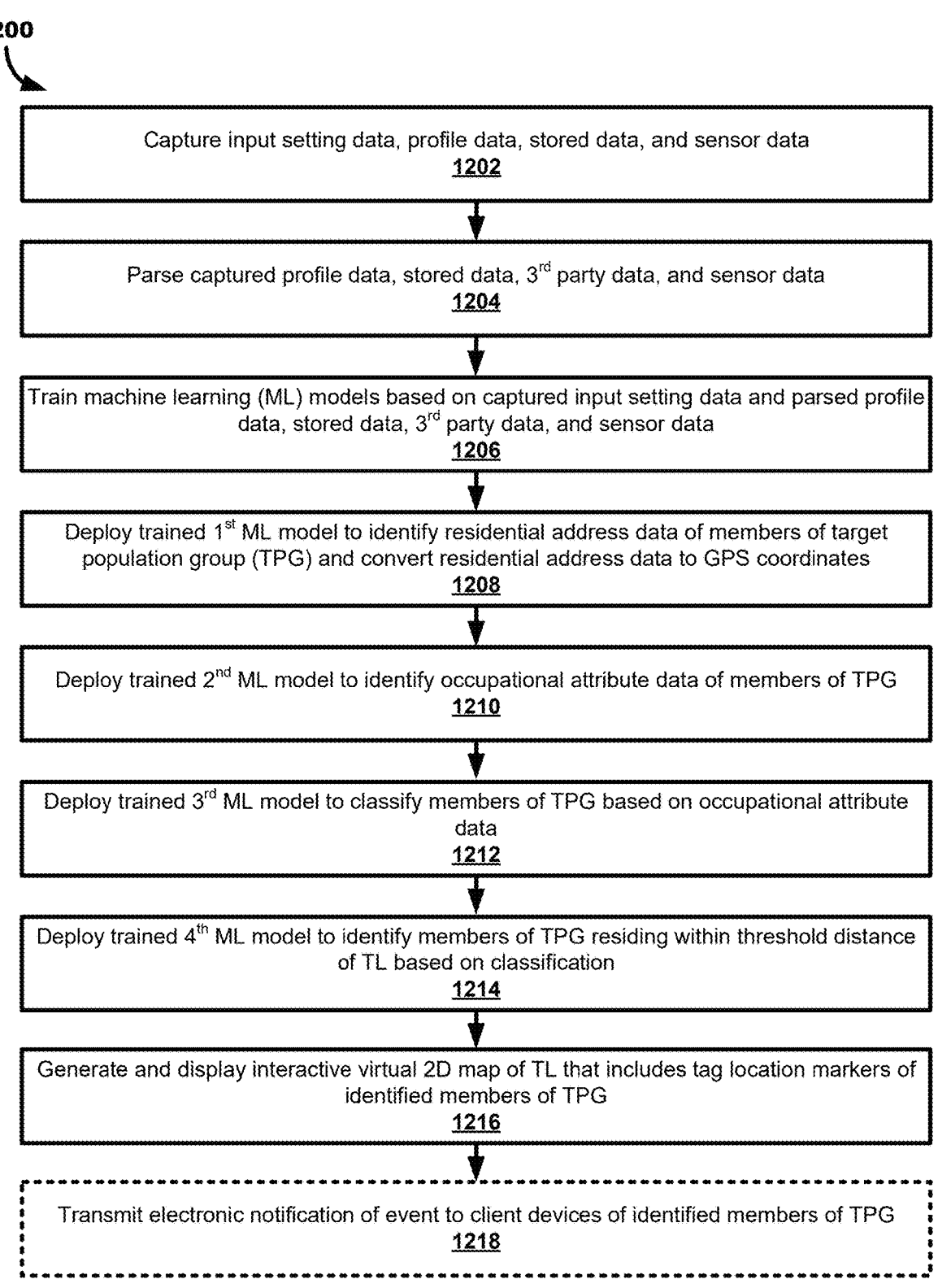

Capture input setting data, profile data, stored data, and sensor data
1202

Parse captured profile data, stored data, 3<sup>rd</sup> party data, and sensor data
1204

Train machine learning (ML) models based on captured input setting data and parsed profile data, stored data, 3<sup>rd</sup> party data, and sensor data
1206

Deploy trained 1<sup>st</sup> ML model to identify residential address data of members of target population group (TPG) and convert residential address data to GPS coordinates
1208

Deploy trained 2<sup>nd</sup> ML model to identify occupational attribute data of members of TPG
1210

Deploy trained 3<sup>rd</sup> ML model to classify members of TPG based on occupational attribute data
1212

Deploy trained 4<sup>th</sup> ML model to identify members of TPG residing within threshold distance of TL based on classification
1214

Generate and display interactive virtual 2D map of TL that includes tag location markers of identified members of TPG
1216

Transmit electronic notification of event to client devices of identified members of TPG
1218

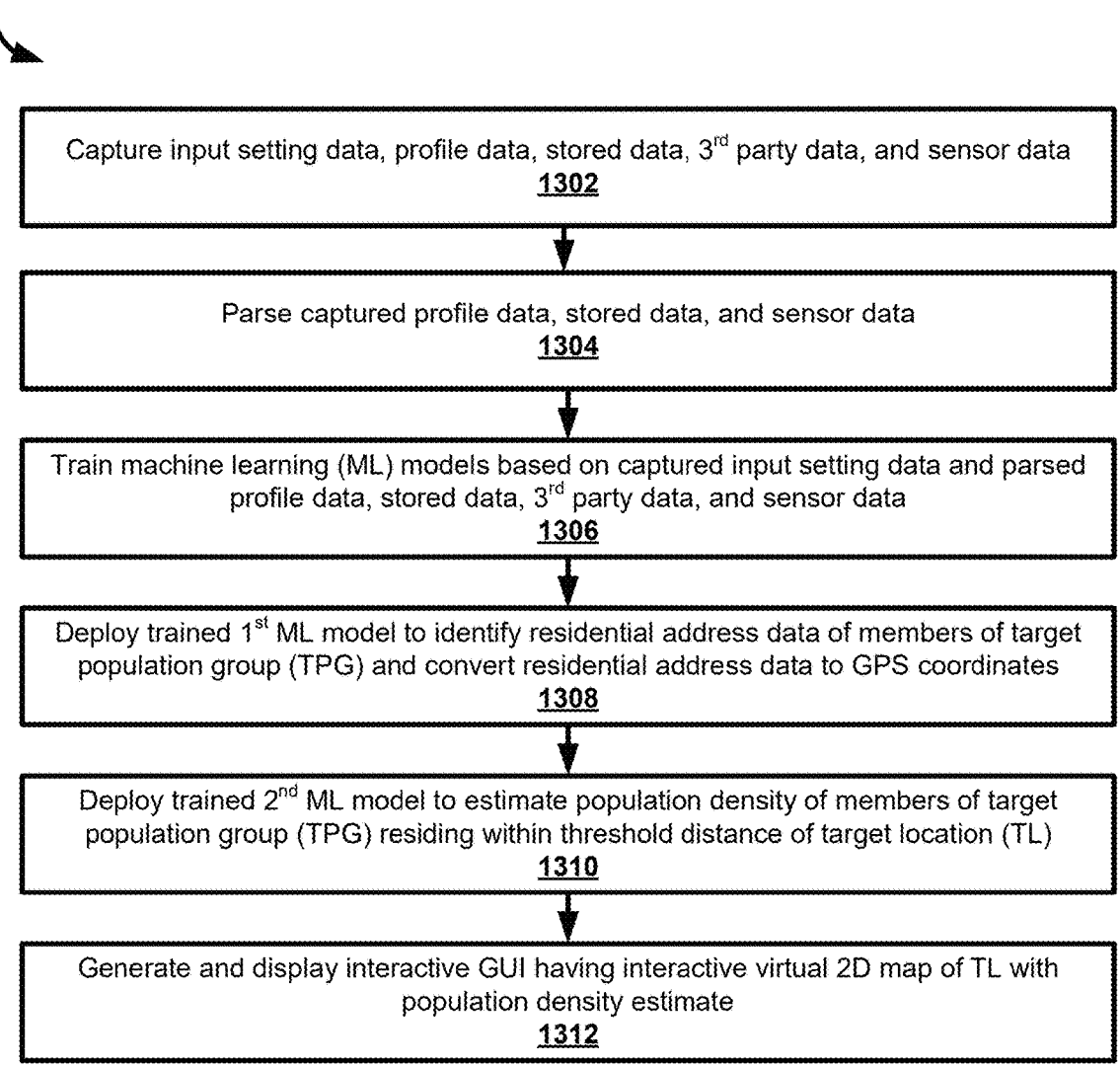

Capture input setting data, profile data, stored data, 3$^{rd}$ party data, and sensor data
1302

Parse captured profile data, stored data, and sensor data
1304

Train machine learning (ML) models based on captured input setting data and parsed profile data, stored data, 3$^{rd}$ party data, and sensor data
1306

Deploy trained 1$^{st}$ ML model to identify residential address data of members of target population group (TPG) and convert residential address data to GPS coordinates
1308

Deploy trained 2$^{nd}$ ML model to estimate population density of members of target population group (TPG) residing within threshold distance of target location (TL)
1310

Generate and display interactive GUI having interactive virtual 2D map of TL with population density estimate
1312

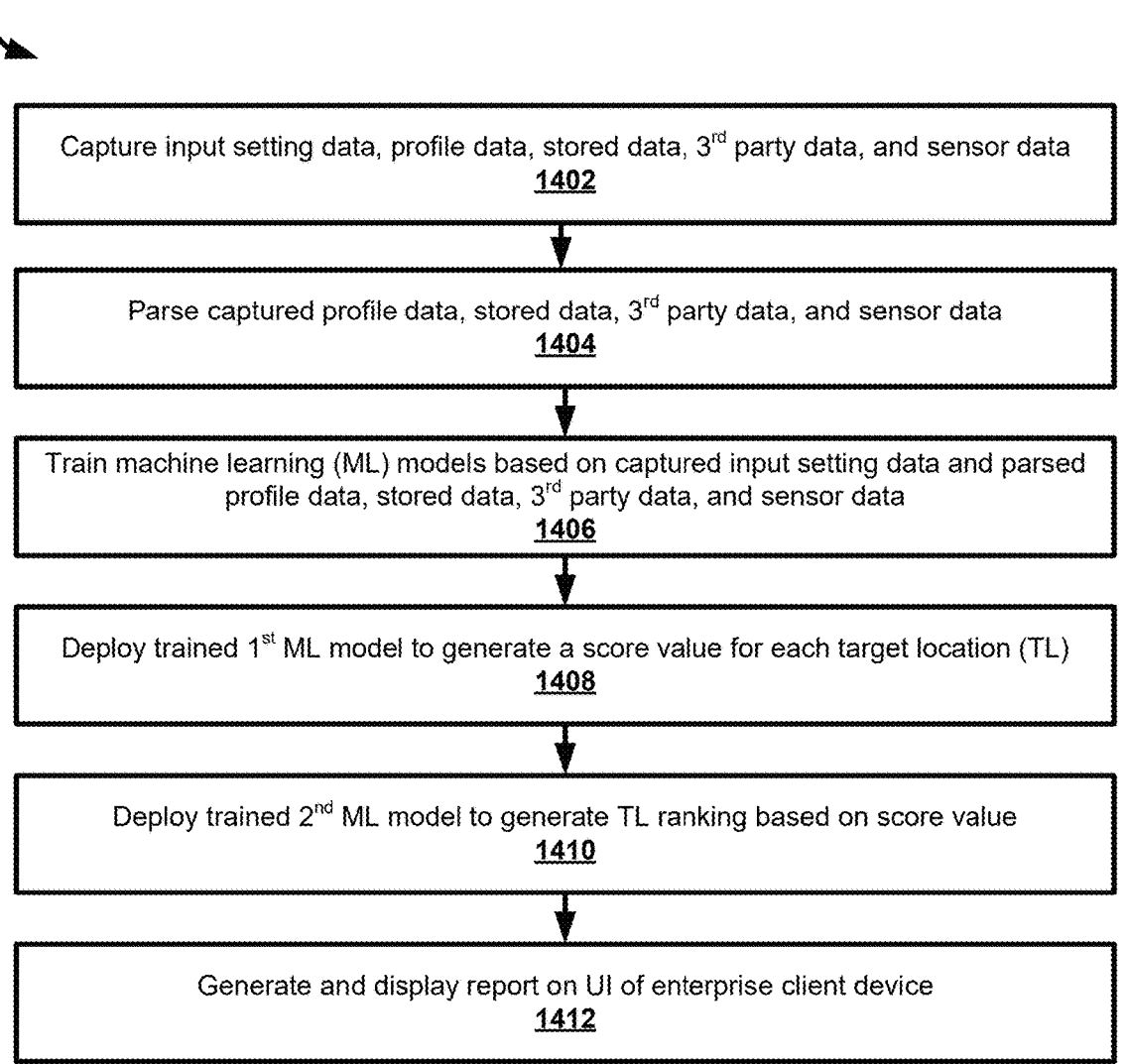

Capture input setting data, profile data, stored data, 3rd party data, and sensor data
1402

Parse captured profile data, stored data, 3rd party data, and sensor data
1404

Train machine learning (ML) models based on captured input setting data and parsed profile data, stored data, 3rd party data, and sensor data
1406

Deploy trained 1st ML model to generate a score value for each target location (TL)
1408

Deploy trained 2nd ML model to generate TL ranking based on score value
1410

Generate and display report on UI of enterprise client device
1412

FIG. 14

TECHNOLOGY FOR AUTOMATED EVENT SCHEDULING

TECHNICAL FIELD

The present disclosure relates to an enterprise computer server system, a computer program product, and a computer-implemented method to automate event scheduling based on geographic location data and profile data of members of a target population group (TPG).

BACKGROUND

Event scheduling is generally conducted manually by one or more persons having different roles. Identifying participants and attendees to the event, especially when conducted manually, is labor intensive, highly inefficient, and prone to mistakes and errors.

SUMMARY

The present disclosure relates to enterprise computer server system, a computer program product, and a computer-implemented method having architecture that streamlines event scheduling by aggregating data (geographic location data, profile data) in a way that exploits data resources to produce relevant output that can be used to quickly and efficiently identify members of a TPG to participate (either actively as an event speaker, event panelist, event coordinator, etc. or passively as an observer or attendee) in the event, estimate the population density of members of the TPG residing within an area defined by a threshold distance value representing a distance from the TL. The TPG may comprise members of a specific class of persons based on one or more occupational attributes, such as, but not limited to, occupation title, occupational skills, education, professional experience, department within an enterprise, professional publications authored/co-authored, etc. The TPG may comprise stakeholders of the enterprise (e.g., employees, board members, etc.).

DRAWINGS

The various advantages of the exemplary embodiments will become apparent to one skilled in the art by reading the following specification and appended claims, and by referencing the following drawings, in which:

Figure 4:
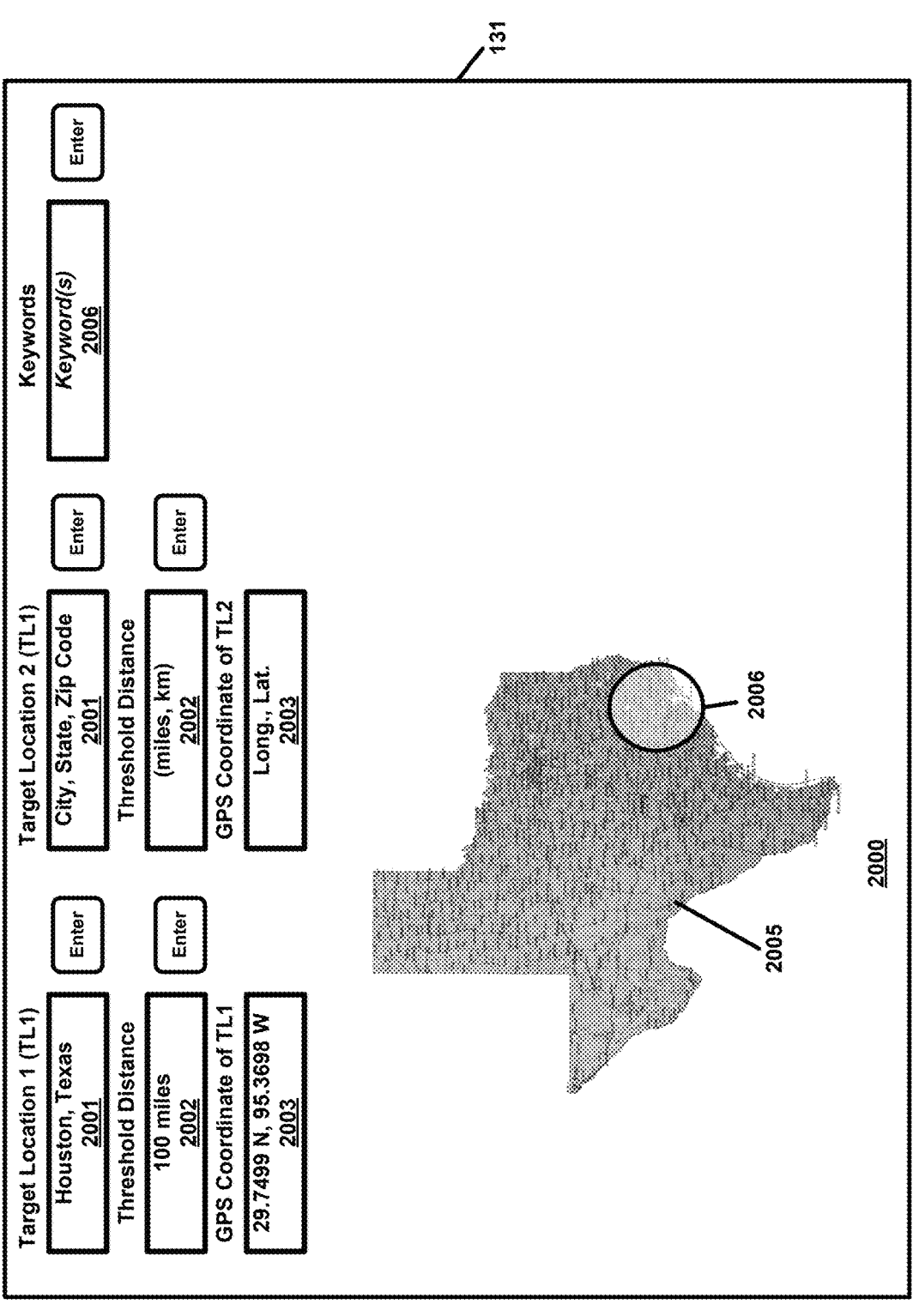
Figure 5:
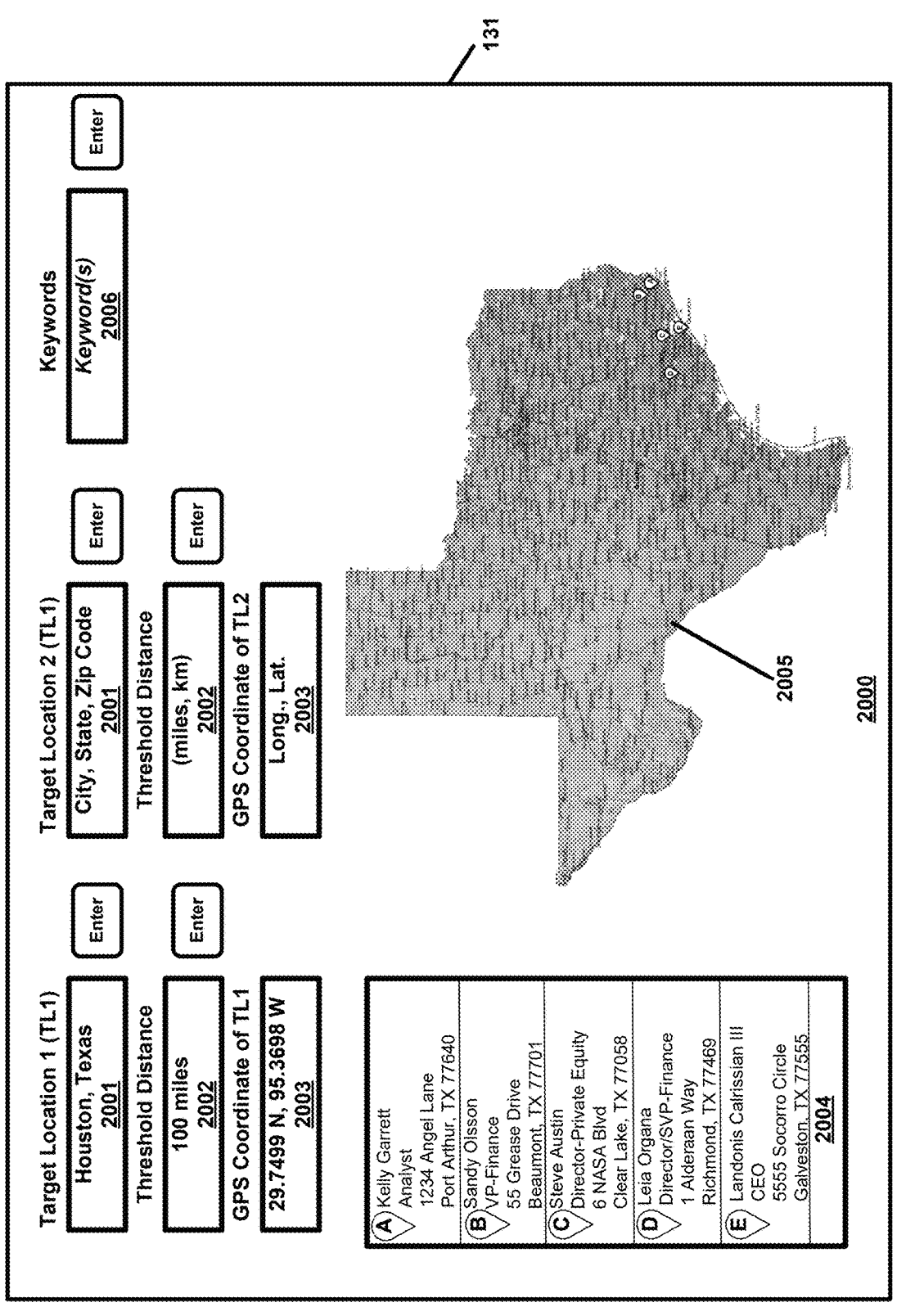

FIGS. 4 and 5 respectively illustrate an interactive graphical user interface (GUI) for visual display on a user interface of an enterprise client device, in accordance with one or more embodiments set forth, illustrated, and described herein.

FIGS. 6 through 14 respectively illustrate computer-implemented methods, in accordance with one or more embodiments set forth and described herein.

DESCRIPTION

The present disclosure relates to enterprise computer server system, a computer program product, and a computer-implemented method having architecture that streamlines event scheduling by aggregating and exploiting data (profile data, sensor data, etc.) to produce relevant output that can be used to quickly and efficiently identify TPG to participate (either actively as an event speaker, event panelist, event coordinator, etc. or passively as an observer or attendee) in the event.

In an example embodiment, an enterprise, Company A, may seek to schedule an event having one or more topics for discussion (e.g., Topics A, B, and C) to be hosted at a target location (TL). At the outset, one or more TLs (e.g., TL1 and TL2) may be candidates to host the event to be scheduled. The basis of the event to be scheduled may include one or more event topics for discussion. In accordance with one or more embodiments, an enterprise computer server system is provided to identify members of a TPG who reside within a threshold distance of each TL based on profile data and sensor data of members of the TPG. The enterprise computer server system may capture input setting data (e.g., TL, threshold distance, keyword(s) related to one or more event topics, etc.) and data and information related to residential address data (to be automatically converted to geographic location data/GPS coordinates), occupational attribute data (including occupational attribute data captured from social media applications such as Facebook™, LinkedIn™, Instagram™, etc.). A virtual 2D geofence may be generated and/or a geographic location filtering rule may be applied to identify members of the TPG residing within the threshold distance. An occupational filtering rule may then be applied to further identify members of the TPG residing within the threshold distance who have one or more occupational attributes (e.g., occupation title, occupational skills, education, professional experience, department within the enterprise, professional publications authored/co-authored by the member, etc.) that correspond to one or more event topics (based on the captured keyword(s)). Responsive to applying the occupational filtering rule, an electronic report may be generated and displayed on a user interface (UI) of an enterprise client device. Alternatively or additionally, an electronic notification of the event may also then be transmitted to client devices of the identified members of the TPG. The electronic notification comprises one or more of a text message, an instant message to a social media account, an email, a calendar invite, and a pop-up notification.

Profile data of each member of the TPG may be stored in non-transitory memory of the enterprise server computing system, and/or an enterprise database, and/or the 3rd party database. The profile data comprises personal identifiable information (PII) data and occupational attribute data. The PII data includes, but is not limited to, full legal name, residential address, email address, and education. The occupational attribute data includes one or more occupational attributes of the members, including, but not limited to, occupational title, occupational skills, department within the enterprise, professional experience, etc.

In accordance with embodiments, a global population group may be targeted based on one or more predefined occupational attributes.

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, Power-Point™, Excel™) and cloud applications which may reside in the cloud (e.g., Gmail™, GitHub™). Cloud applications may correspond to applications on the client device or may be other types such as social media applications (e.g., Facebook™).

As used herein, "artificial intelligence (AI)" relates to one or more computer system operable to perform one or more tasks that normally require human intelligence, such as visual perception, speech recognition, decision-making, and translation between languages.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" or "mobile device" relates to any device associated with a user, including personal computers, laptops, tablets, and/or mobile smartphones.

As used herein, "geofence" relates to a virtual perimeter or boundary around a geographic location.

As used herein, "geographic location" relates to a physical place or point on a surface of the earth that is represented by latitude and longitude coordinates.

As used herein, "machine learning" relates to an application of AI that provides computer systems the ability to automatically learn and improve from data and experience without being explicitly programmed.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code running on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "target location" or a "point-of-interest (POI) location" relates to a specific location on the surface of the earth that is a candidate location to host an event to be scheduled (i.e., the event to occur at a future date).

As used herein, "user" relates to a consumer, machine entity, and/or requesting party, and may be human or machine.

Figure 1:
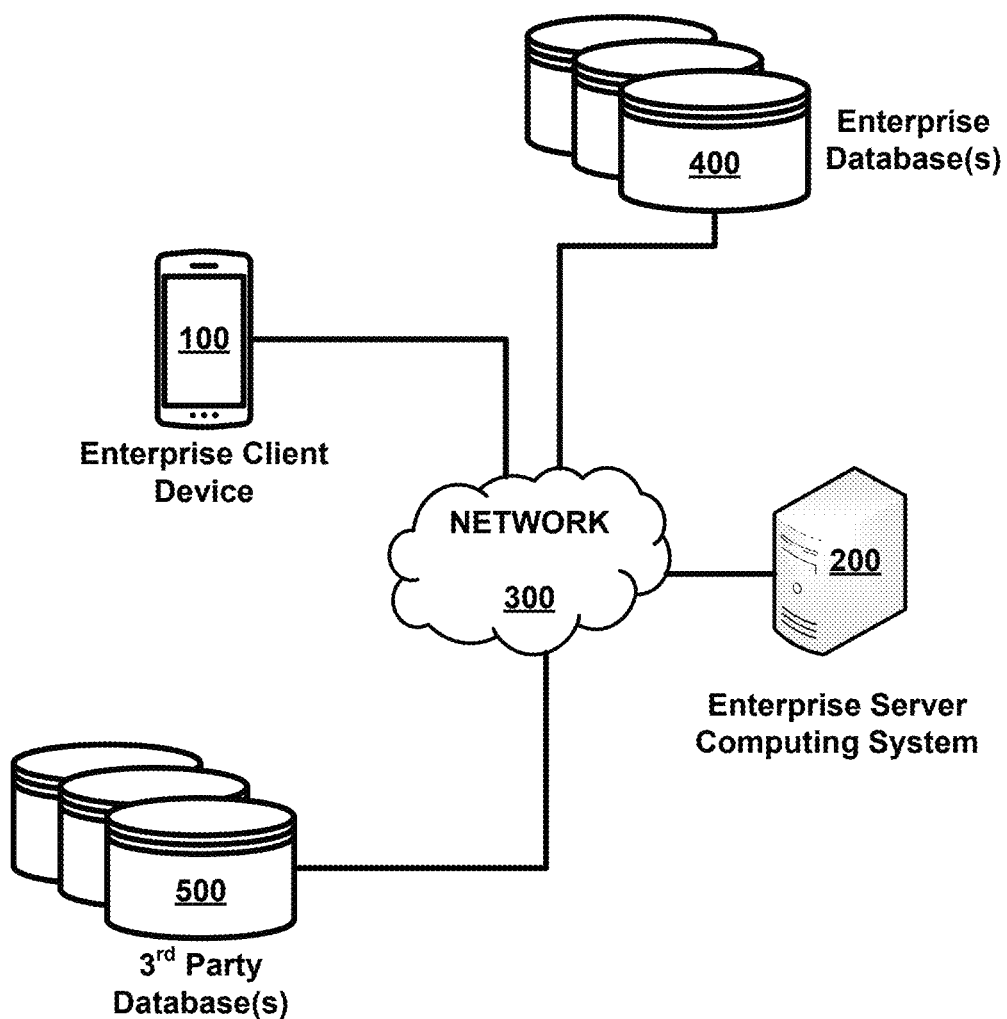
FIG. 1 illustrates a communication environment, in accordance with one or more embodiments set forth, illustrated, and described herein.

Turning to the figures, in which FIG. 1 illustrates a communication environment that facilitates communications between one or more parties. The communication environment includes the enterprise client device 100, an enterprise server computing system 200, a communication network 300 through which communication is facilitated between the enterprise client device 100 and the enterprise server computing system 200, one or more enterprise databases 400, and one or more third-party databases 500.

In accordance with one or more embodiments set forth, described, and/or illustrated herein, the enterprise client device 100 comprises a computing device, including but not limited to a desktop computer, a laptop computer, a smart phone, a handheld personal computer, a workstation, a game console, a cellular phone, a client device, a personal computing device, a wearable electronic device, a smartwatch, smart eyewear, a tablet computer, a convertible tablet computer, or any other electronic, microelectronic, or microelectromechanical device for processing and communicating data. This disclosure contemplates the enterprise client device 100 comprising any form of electronic device that optimizes or otherwise transforms the performance and functionality of the one or more embodiments in a manner that falls within the spirit and scope of the principles of this disclosure.

Figure 2:
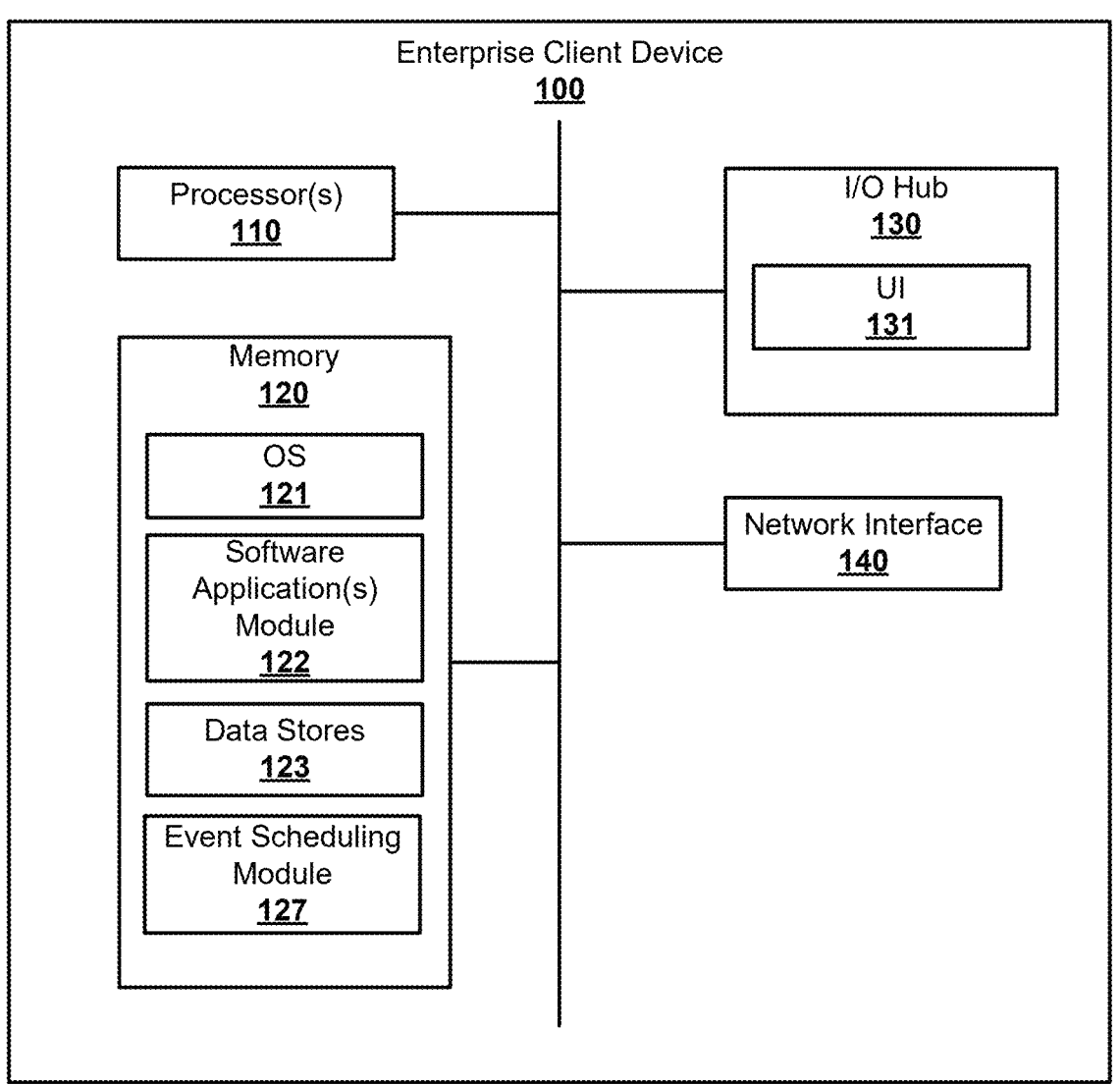
FIG. 2 illustrates a block diagram of the enterprise client device of FIG. 1.

In the illustrated example embodiment of FIG. 2, some of the possible operational elements of the enterprise client device 100 are illustrated in FIG. 2 and will now be described herein. It will be understood that it is not necessary for the enterprise client device 100 to have all the elements illustrated in FIG. 2. For example, the enterprise client device 100 may have any combination of the various elements illustrated in FIG. 2. Moreover, the enterprise client device 100 may have additional elements to those illustrated in FIG. 2.

The enterprise client device 100 includes one or more processors 110, a non-transitory memory 120 operatively coupled to the one or more processors 110, an I/O hub 130, and a network interface 140.

The non-transitory memory 120 comprises a set of instructions of computer-executable program code. The set of instructions are executable by the one or more processors 110 to cause execution of an operating system 121 and one or more software applications of a software application module 122 that reside in the non-transitory memory 120. The one or more software applications residing in the non-transitory memory 120 includes, but is not limited to, an enterprise application that is associated with the enterprise. The enterprise application comprises a mobile application or desktop application that facilitates establishment of a secure connection between the enterprise client device 100 and the enterprise server computing system 200. The one or more processors 110 are operable to execute the mobile application or desktop application.

The non-transitory memory 120 also includes one or more data stores 123 that are operable to store one or more types of data. The enterprise client device 100 may include one or more interfaces that facilitate one or more systems or modules thereof to transform, manage, retrieve, modify, add, or delete, the data residing in the data stores 123. The one or more data stores 123 may comprise volatile and/or non-volatile memory. Examples of suitable data stores 123 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123 may be a component of the one or more processors 110 or alternatively, may be operatively connected to the one or more processors 110 for use thereby. As set forth, described, and/or illustrated herein, "operatively connected" may include direct or indirect connections, including connections without direct physical contact.

In accordance with one or more embodiments set forth, described, and/or illustrated herein, the enterprise client device 100 includes an I/O hub 130 operatively connected to other systems and subsystems of the enterprise client device 100. The I/O system 130 may include one or more of an input interface, an output interface, and a network controller to facilitate communications between the enterprise client device 100 and the enterprise server computing system 200. The input interface and the output interface may be integrated as a single, unitary user interface 131*a*, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110 to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the enterprise client device 100 may serve as both a component of the input interface and a component of the output interface.

The enterprise client device 100 also includes a network interface 140 operable to facilitate connection to the network 300.

Figure 3:
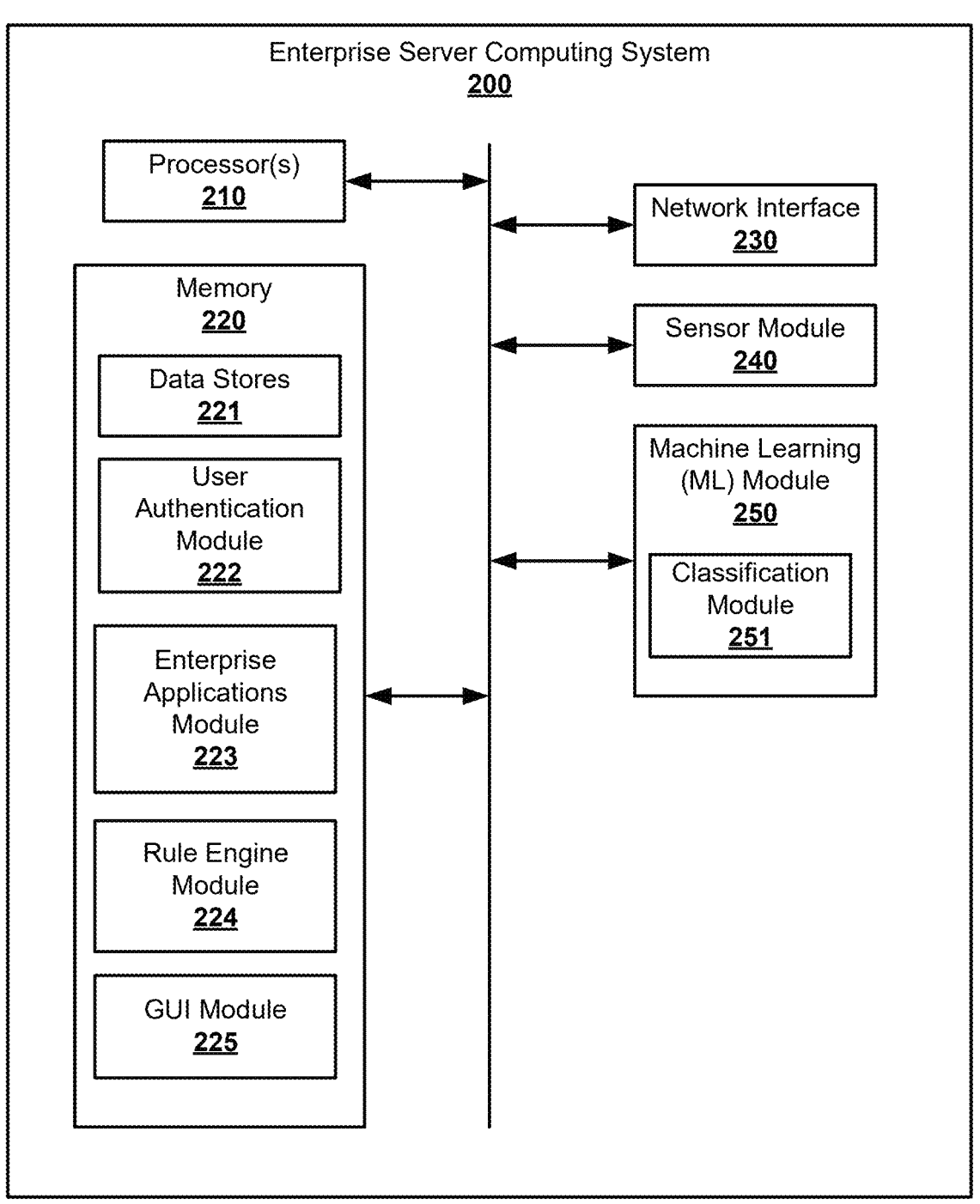
FIG. 3 illustrates a block diagram of the enterprise server computing system of FIG. 1.

As illustrated in FIG. 3, the enterprise server computing system 200 comprises one or more server computers, such as for example, an application program interface (API) server computer. The enterprise server computing system 200 includes one or more processors 210, a non-transitory memory 220 operatively coupled to the one or more processors 210, a network interface 230, a sensor module 240, and a machine learning (ML) module 250. Some of the possible operational elements of each server in the enterprise server computing system 200 are illustrated in FIG. 3 and will now be described herein. It will be understood that it is not necessary for each server in the enterprise server computing system 200 to have all the elements illustrated in FIG. 3. For example, each server in the enterprise server computing system 200 may have any combination of the various elements illustrated in FIG. 3. Moreover, each server in the enterprise server computing system 200 may have additional elements to those illustrated in FIG. 3.

The enterprise server computing system 200 may be controlled by a system manager (or policy manager) of the enterprise.

In accordance with one or more embodiments set forth, described, and/or illustrated herein, the enterprise server computing system 200 may comprise one or more computing devices, each computing device including but not limited to a server computer, a desktop computer, a laptop computer, a smart phone, a handheld personal computer, a workstation, a game console, a cellular phone, a client device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the enterprise server computing system 200 comprising any form of electronic device that optimizes or otherwise transforms the performance and functionality of the one or more embodiments in a manner that falls within the spirit and scope of the principles of this disclosure.

The non-transitory memory 220 comprises a set of instructions of computer-executable program code. The set of instructions are executable by the one or more processors 210 in manner that facilitates control of a user authentication module 222, an enterprise application module 223 having one or more enterprise applications that reside in the non-transitory memory 220, a rule engine module 224, and a graphical user interface (GUI) module 225. In accordance with one or more embodiments set forth, described, and/or illustrated herein, the enterprise server computing system 200 may individually or collectively execute the instructions to perform any one or more of the methodologies set forth, described, and illustrated herein.

The non-transitory memory 220 also includes one or more data stores 221 that are operable to store one or more types of data, including but not limited to, input setting data, profile data, user account data, user authentication data, sensor data, etc. For instance, the one or more data stores 221 may comprise a storage location on which one or more electronic files reside. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The non-transitory memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server computer (e.g., server), such that the instructions, when executed by the one or more processors 210, cause the enterprise server computing system 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The computer-executable program code may instruct the one or more processors 210 to cause the user authentication module 221 to authenticate a user in order to gain user access data, and systems and sub-systems of the enterprise server computing system 200. The user authentication module 221 may be caused to request user input data or user identification data that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the enterprise server computing system 200, in addition to certain communication functions of the enterprise server computing system 200. The one or more enterprise applications of the enterprise application module 222 are operable to communicate with the enterprise client device 100 in a manner which facilitates user access to data, and systems and sub-systems of the enterprise server computing system 200 based on successful user authentication.

The sensor module 240 is operable, at least during execution of the mobile application or desktop application by the enterprise client device 100, to dynamically detect, determine, assess, monitor, measure, quantify, and/or sense information about the enterprise client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of one or more client devices.

The ML module 250 may comprise one or more processors, and one or more data stores (e.g., non-volatile memory/ NVM and/or volatile memory) containing a set of instructions, which when executed by the one or more processors, cause the ML module 250 to capture data and information from the one or more processors 210, the non-transitory memory 220, the sensor module 240, the enterprise database 400, any third-party database(s) 500, and any other input/ output sources, and process the captured data and information to, inter alia, to train one or more machine learning models of the enterprise server computing system 200 based on the captured data and information.

The ML module 250 may include one or more ML algorithms to train one or more machine learning models of the enterprise server computing system 200 based on the captured data and information. The ML algorithms may include one or more of a linear regression algorithm, a logical regression algorithm, or a combination of different algorithms. A neural network may also be used to train the system based on captured data, including, but not limited to, authentication data, geographic location data, sensor data, profile data, etc. In one or more example embodiments, such a neural network may include, but is not limited to, a YOLO neural network. The ML module 250 may analyze the captured data and/or information, and transform the captured data and/or information in a manner which provides enhanced communication between the enterprise client device 100 and the enterprise server computing system 200.

Data and information may be captured based on predefined preferences, including, but not limited to location (e.g., as defined by geography from address, zip code, or GPS coordinates), etc. The captured data and information may also be up-linked to other systems and modules in the enterprise server computing system 200 for further processing to discover additional information that may be used to enhance the understanding of the data and information. The ML module 250 may also transmit information to other client devices, and link to other electronic devices, including but not limited to smart phones, smart home systems, or Internet-of-Things (IoT) devices. The ML module 250 may thereby communicate with/to other client devices, systems, users, etc.

In accordance with one or more embodiments, the ML module 250 may comprise a classification module 251. The classification module 251 may be implemented as computer readable program code that, when executed by the one or more processors 210, implements one or more of the various processes set forth, described, and/or illustrated herein, including, for example, to classify a member of a TPG (e.g., event attendees and/or event participants) based on captured profile data associated with the member. The TPG may comprise members of a specific class of persons based on one or more occupational attributes, such as, but not limited to, occupation title, occupational skills, education, professional experience, department within the enterprise, professional publications authored/co-authored, etc. The TPG may comprise stakeholders of the enterprise (e.g., employees, board members, etc.). The profile data may comprise personal identifiable information (PII) data of members of the TPG and occupational attribute data of members of the TPG. The PII data includes, but is not limited to, full legal name, residential address, email address, and education. The occupational attribute data includes one or more occupational attributes of the members, including, but is not limited to, occupation title, occupational skills, education, professional experience, department within the enterprise, professional publications authored/co-authored, etc. The classification module 251 may comprise logic instructions executable by the one or more processors 210 and/or the ML module 250.

In accordance with one or more embodiments, the classification module 251 may be configured to train a ML model to classify a member of the TPG based on the captured profile data of the member. The classification may be in accordance with one or more predefined classifications stored in the non-transitory memory 220.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the enterprise client device 100, execute an enterprise mobile application or an enterprise desktop application over the communication network 300. Upon user launching the enterprise mobile application or the enterprise desktop application on the enterprise client device 100, the computer-executable program code may instruct the one or more processors 210 to cause the user authentication module 222 to authenticate the enterprise client device 100.

As illustrated in FIG. 4, upon the enterprise client device 100 being authenticated by the user authentication module 222, the computer-executable program code may instruct the one or more processors 210 to cause the GUI module 225 to generate an interactive graphical user interface (GUI) 2000 for visual display on the user interface 131 of the enterprise client device 100. The interactive GUI 2000 comprises a plurality of input fields to facilitate a capture of input setting data. The plurality of input fields include one or more first input fields 2001 to capture TL data (city, county, address, state, zip code) for one or more TL that are candidates to host an event to be scheduled, and one or more second input fields 2002 to capture a threshold distance value representing a distance from the TL (a numeric value expressed in miles or kilometers) to establish a virtual boundary or perimeter of a virtual geofence around each TL, and one or more third input settings to capture one or more keyword(s) related to one or more event topics. In one example embodiment, the threshold distance value can be 5 miles, 10 miles, 15 miles, 50 miles, 100 miles, 150 miles etc. Embodiments, however, are not limited thereto, and thus, this disclosure contemplates any numeric value randomly established by the user that falls within the spirit and scope of the principles of this disclosure. Although the illustrated example embodiments includes two first input fields 2001 to capture TL data (city, county, address, state, zip code), embodiments, however, are not limited thereto. This disclosure contemplates the input interface comprising any suitable configuration that falls within the spirit and scope of the principles of this disclosure. For example, the interactive GUI 2000 may comprise three or more input fields to capture TL data for a plurality of TL that are candidates to host the event.

In response to capture of the TL data and the threshold distance value, the computer-executable program code may instruct the one or more processors 210 to perform or otherwise execute one or more of the following operations: (i) cause the GUI module 225 to generate and display an interactive virtual 2D map 2005 at the interactive GUI 2000 that displays the TL and a corresponding virtual geofence 2006 based on the captured threshold distance value for each TL, (ii) obtain geographic location data (e.g., GPS coordinates expressed by longitude and latitude) for each TL, (iii) cause the GUI module 225 to generate and display the GPS coordinates of the TL at an output field 2003 of the interactive GUI 2000, (iv) capture profile data of members of a TPG that includes residential address data and occupational attribute data of the members, (v) execute conversion of the residential address data to GPS coordinates, and (vi) cause the rule engine module 224 to apply a geographic location filtering rule to filter the profile data by removing or otherwise excluding all members of the TPG having a residential address that is outside of the boundaries of the virtual geofence, (vi) cause the rule engine module 224 to apply an occupational attribute filtering rule to filter the profile data by removing all members of the TPG lacking one or more predefined occupational attributes (e.g., occupational attributes that correspond to the captured keywords), and (vii) cause the GUI module 225 to generate and display a report 2004 listing the profile data of the identified TPG and an updated map 2005 include location tags representing the geographic locations of the identified members of the TPG (See, FIG. 5B). Thus, application of one or more filtering rules facilitates the identification of members of the TPG having an address that is within the boundaries of the virtual geofence and/or who have one or more predefined occupational attributes.

In an example embodiment in which a plurality of TL are contemplated to host the event, the GUI module 225 may generate an interactive virtual 2D map 2005 listing each TL, the interactive virtual 2D map 2005 including a corresponding virtual geofence 2006 generated by the geofence module 224 based on the captured threshold distance value for each TL.

The computer-executable program code may instruct the one or more processors 210 to cause the sensor module 240 to detect the current geographic location of an enterprise client device 100 of members of the TPG (e.g., those members of the TPG residing within a threshold distance of the TL). The detection may be based on wireless network connectivity data, stored geographic location data residing in the memory 220, and sensor data relating to the detected current geographic location of the enterprise client device 100. The wireless network connectivity data may include but is not limited to, an internet protocol (IP) address of the enterprise client device 100, network identifier for the network 300, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs, etc. The sensor data may include but is not limited to, global positioning system (GPS) data of the enterprise client device 100. This disclosure contemplates conducting the geographic location analysis based on any data indicative of a geographic location of the enterprise client device 100 and which optimizes or otherwise transforms the performance and functionality of the one or more embodiments in a manner that falls within the spirit and scope of the principles of this disclosure.

Illustrated examples shown in FIGS. 6 to 13 set forth computer-implemented methods 600, 700, 800, 900, 1000, 1100, 1200, 1300, and 1400. In one or more examples, the respective flowcharts of the computer-implemented methods 600, 700, 800, 900, 1000, 1100, 1200, 1300, and 1400 may be implemented by the one or more processors 210 of the enterprise server computing system 200. In particular, the computer-implemented methods 600, 700, 800, 900, 1000, 1100, 1200, 1300, and 1400 may be implemented as one or more modules in a set of logic instructions stored in a non-transitory machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the enterprise server computing system 200 provides functionality described or illustrated herein. In particular, software executed by the one or more processors 210 is operable to perform one or more processing blocks of the computer-implemented methods 600, 700, 800, 900, 1000, 1100, 1200, 1300, and 1400 set forth, described, and/or illustrated herein, or provides functionality set forth, described, and/or illustrated.

As illustrated in FIG. 6, illustrated process block 602 includes capturing, by an enterprise server computing system (e.g., enterprise server computing system 200), input setting data from an enterprise client device (e.g., enterprise client device 100).

In accordance with illustrated process block 602, the enterprise client device may be an authenticated enterprise client device having been authenticated via an authentication protocol implemented by a user authentication module (e.g., user authentication module 222) of the enterprise server computing system.

In accordance with illustrated process block 602, the input setting data comprises one or more target locations (TL) (e.g., denoted by one or more of: zip code city, town, country, and state) to host an event to be scheduled.

In accordance with illustrated process block 602, the input setting data comprises a threshold distance value representing a distance from the TL.

In accordance with illustrated process block 602, the threshold distance value can be a numeric value expressed in miles or km (e.g., 5 miles, 10 miles, 15 miles, 50 miles, etc.).

The computer-implemented method 600 may then proceed to illustrated process block 604, which includes obtaining, by the enterprise server computing system, geographic location data (e.g., GPS coordinates expressed by longitude and latitude) for each TL.

In accordance with illustrated process block 604, the geographic location data is obtained by accessing geographic location data stored in (i) non-transitory memory of the enterprise server computing system, and/or (ii) an enterprise database, and/or (iii) a 3rd party database (e.g., 3rd party databases 500).

The computer-implemented method 600 may then proceed to illustrated process block 606, which includes generating and applying, by the enterprise server computing system, a virtual 2D geofence around each TL based on the threshold distance value.

The computer-implemented method 600 may then proceed to illustrated process block 608, which includes capturing or acquiring, by the enterprise server computing system, residential address data of members of a TPG to attend the event.

In accordance with illustrated process block 608, the TPG may comprise members of a specific class of persons based on one or more occupational attributes such as, but not limited to, occupation title, occupational skills, education, professional experience, department within the enterprise, professional publications authored/co-authored by the member, etc.

In accordance with illustrated process block 608, the TPG may comprise stakeholders of the enterprise (e.g., employees, board members, etc.).

In accordance with illustrated process block 608, the residential address data is captured or acquired from one or more sources (e.g., non-transitory memory of the enterprise server computing system, and/or an enterprise database, and/or a 3rd party database).

The computer-implemented method 600 may then proceed to illustrated process block 610, which includes automatically executing, by the enterprise server computing system, conversion of the captured residential address data to GPS coordinates (expressed by longitude and latitude).

The computer-implemented method 600 may then proceed to illustrated process block 612, which includes applying, by the rule engine module 224 of the enterprise server computing system in response to executing the conversion, a geographic location filtering rule to identify members of the TPG having a geographic location that is within the boundaries of the virtual 2D geofence.

The computer-implemented method 600 may then proceed to illustrated process block 614, which includes generating, by the enterprise server computing system in response to applying the geographic location filtering rule, a report that lists the identified members of the TPG on the UI of the enterprise client device.

In accordance with illustrated process block 614, the report may comprise the profile data of each identified member.

The computer-implemented method 600 may then proceed to illustrated process block 616, which includes generating and transmitting, by the enterprise server computing system, an electronic notification of the event to client devices of the identified members of the TPG.

In accordance with illustrated process block 616, the electronic notification comprises one or more of a text message, an instant message to a social media account, an email, a calendar invite, and a pop-up notification.

In accordance with illustrated process block 616, under circumstances in which there are two or more TL that are being considered to host the event, the electronic notification of the event is transmitted to members of the TPG that reside in the TL having the greatest population density of TPG.

Figure 7:
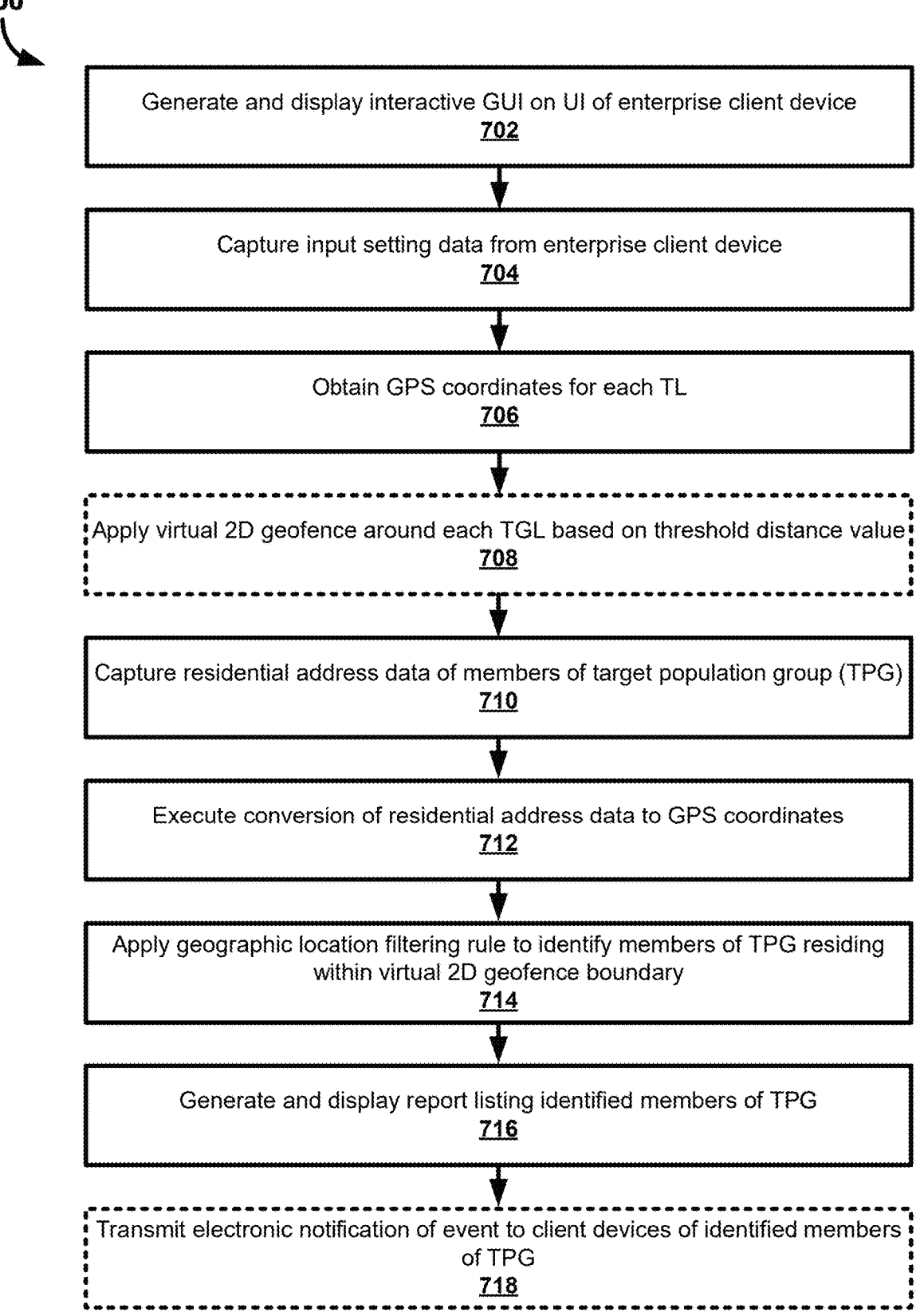

As illustrated in FIG. 7, illustrated process block 702 includes generating and displaying, via an interactive GUI module (e.g., GUI module 225) of an enterprise server computing system (e.g., enterprise server computing system 200), an interactive GUI on a user interface of an enterprise client device (e.g., enterprise client device 100).

In accordance with illustrated process block 702, the enterprise client device may be an authenticated enterprise client device having been authenticated via an authentication protocol implemented by a user authentication module (e.g., user authentication module 222) of the enterprise server computing system.

The computer-implemented method 700 may then proceed to illustrated process block 704, which includes capturing, by the enterprise server computing system, input setting data from the enterprise client device.

In accordance with illustrated process block 704, the input setting data is captured from one or more input fields of the interactive GUI.

In accordance with illustrated process block 704, the input setting data comprises one or more target locations (TL) (e.g., zip code, city, town, country, state, etc.) to host an event to be scheduled.

In accordance with illustrated process block 704, the input setting data comprises a threshold distance value representing a distance from the TL.

In accordance with illustrated process block 704, the threshold distance value can be a numeric value expressed in miles or km (e.g., 5 miles, 10 miles, 15 miles, 50 miles, etc.).

The computer-implemented method 700 may then proceed to illustrated process block 706, which includes obtaining, by the enterprise server computing system, geographic location data (e.g., GPS coordinates expressed by longitude and latitude) for each TL.

In accordance with illustrated process block 706, the geographic location data is obtained by accessing geographic location data stored in (i) non-transitory memory of the enterprise server computing system, and/or (ii) an enterprise database, and/or (iii) the 3rd party database.

The computer-implemented method 700 may then proceed to illustrated process block 708, which includes generating and applying, by the enterprise server computing system, a virtual 2D geofence around each TL based on the threshold distance value.

The computer-implemented method 700 may then proceed to illustrated process block 710, which includes capturing or acquiring, by the enterprise server computing system, residential address data of members of a TPG for the event.

In accordance with illustrated process block 710, the TPG may comprise members of a specific class of persons based on one or more occupational attributes such as, but not limited to, occupation title, occupational skills, education, professional experience, department within the enterprise, professional publications authored/co-authored by the member, etc.

In accordance with illustrated process block 710, the TPG may comprise stakeholders of the enterprise (e.g., employees, board members, etc.).

In accordance with illustrated process block 710, the residential address data is captured or acquired from one or more sources (e.g., non-transitory memory of the enterprise server computing system, and/or an enterprise database, and/or one or more 3rd party databases).

The computer-implemented method 700 may then proceed to illustrated process block 712, which includes automatically executing, by the enterprise server computing system, conversion of the captured residential address data to GPS coordinates (expressed by longitude and latitude).

The computer-implemented method 700 may then proceed to illustrated process block 714, which includes applying, by the rule engine module 224 of the enterprise server computing system in response to executing the conversion, a geographic location filtering rule to identify members of the TPG having a geographic location that is within the boundaries of the virtual 2D geofence.

The computer-implemented method 700 may then proceed to illustrated process block 716, which includes generating and displaying, by the enterprise server computing system in response to applying the geographic location filtering rule, a report that lists the identified members of the TPG on the UI of the enterprise client device.

In accordance with illustrated process block 716, the report may comprise the profile data of each identified member.

The computer-implemented method 700 may then proceed to illustrated process block 718, which includes generating and transmitting, by the enterprise server computing system, an electronic notification of the event to client devices of the identified members of the TPG.

In accordance with illustrated process block 718, the electronic notification comprises one or more of a text message, an instant message to a social media account, an email, a calendar invite, and a pop-up notification.

In accordance with illustrated process block 718, under circumstances in which there are two or more TL that are being considered to host the event, the electronic notification of the event is transmitted to members of the TPG that reside in the TL having the greatest population density of TPG.

As illustrated in FIG. 8, illustrated process block 802 includes generating and displaying, via an interactive GUI module (e.g., GUI module 225) of an enterprise server computing system (e.g., enterprise server computing system 200), an interactive GUI on a user interface of an enterprise client device (e.g., enterprise client device 100).

In accordance with illustrated process block 802, the enterprise client device may be an authenticated enterprise client device having been authenticated via an authentication protocol implemented by a user authentication module (e.g., user authentication module 222) of the enterprise server computing system.

The computer-implemented method 800 may then proceed to illustrated process block 804, which includes capturing, by the enterprise server computing system, input setting data from the enterprise client device.

In accordance with illustrated process block 804, the input setting data is captured from one or more input fields of the interactive GUI.

In accordance with illustrated process block 804, the input setting data comprises one or more target locations (TL) (e.g., zip code, city, town, country, state, etc.) to host an event to be scheduled.

In accordance with illustrated process block 804, the input setting data comprises a threshold distance value representing a distance from the TL.

In accordance with illustrated process block 804, the threshold distance value can be a numeric value expressed in miles or km (e.g., 5 miles, 10 miles, 15 miles, 50 miles, etc.).

The computer-implemented method 800 may then proceed to illustrated process block 806, which includes obtaining, by the enterprise server computing system, geographic location data (e.g., GPS coordinates expressed by longitude and latitude) for each TL.

In accordance with illustrated process block 806, the geographic location data is obtained by accessing geographic location data stored in one or more of: (i) non-transitory memory of the enterprise server computing system, and/or (ii) one or more enterprise databases (e.g., enterprise databases 400), and/or (iii) one or more 3rd party databases (e.g., 3rd party databases 500).

The computer-implemented method 800 may then proceed to illustrated process block 808, which includes generating and displaying, via the interactive GUI module (e.g., GUI module 225) of the enterprise server computing system, an interactive virtual 2D map of each TL on the UI of the enterprise client device.

In accordance with illustrated process block 808, generating the interactive virtual 2D map comprises generating and displaying a virtual 2D geofence around each TL based on the captured threshold distance value.

The computer-implemented method 800 may then proceed to illustrated process block 810, which includes capturing or acquiring, by the enterprise server computing system, residential address data of members of a TPG for the event.

In accordance with illustrated process block 810, the TPG may comprise members of a specific class of persons based on one or more occupational attributes that includes, but is not limited to, occupation title, occupational skills, education, professional experience, department within the enterprise, professional publications authored/co-authored by the member, etc.

In accordance with illustrated process block 810, the TPG may comprise stakeholders of the enterprise (e.g., employees, board members, etc.).

In accordance with illustrated process block 810, the residential address data is captured or acquired from one or more sources (e.g., non-transitory memory of the enterprise server computing system, and/or an enterprise database, and/or one or more 3rd party databases).

The computer-implemented method 800 may then proceed to illustrated process block 812, which includes automatically executing, by the enterprise server computing system, conversion of the captured residential address data to GPS coordinates (expressed by longitude and latitude).

The computer-implemented method 800 may then proceed to illustrated process block 814, which includes applying, by the rule engine module 224 of the enterprise server computing system in response to executing the conversion, a geographic location filtering rule to identify members of the TPG having a geographic location that is within the boundaries of the virtual 2D geofence.

In accordance with illustrated process block 814, the interactive virtual 2D map may include location tags representing the geographic locations of the identified members of the TPG.

The computer-implemented method 800 may then proceed to illustrated process block 816, which includes generating and displaying, by the enterprise server computing system in response to executing the geographic location filtering, a report listing the identified members of the TPG for each TL on the UI of the enterprise client device.

The computer-implemented method 800 may then proceed to illustrated process block 818, which includes generating and transmitting, by the enterprise server computing system in response to executing the geographic location filtering, an electronic notification of the event to client devices of the identified members of the TPG.

In accordance with illustrated process block 818, the electronic notification comprises one or more of a text message, an instant message to a social media account, an email, a calendar invite, and a pop-up notification.

In accordance with illustrated process block 818, under circumstances in which there are two or more TL that are being considered to host the event, the electronic notification of the event is transmitted to members of the TPG that reside in the TL having the greatest population density of TPG.

As illustrated in FIG. 9, illustrated process block 902 includes capturing, by an enterprise server computing system (e.g., enterprise server computing system 200), input setting data from an enterprise client device (e.g., enterprise client device 100).

In accordance with illustrated process block 902, the enterprise client device may be an authenticated enterprise client device having been authenticated via an authentication protocol implemented by a user authentication module (e.g., user authentication module 222) of the enterprise server computing system.

In accordance with illustrated process block 902, the input setting data comprises one or more target locations (TL) (e.g., zip code, city, town, country, state, etc.) to host an event to be scheduled.

In accordance with illustrated process block 902, the input setting data comprises a threshold distance value representing a distance from the TL.

In accordance with illustrated process block 902, the threshold distance value can be a numeric value expressed in miles or km (e.g., 5 miles, 10 miles, 15 miles, 50 miles, etc.).

The computer-implemented method 900 may then proceed to illustrated process block 904, which includes obtaining, by the enterprise server computing system, geographic location data (e.g., GPS coordinates expressed by longitude and latitude) for each TL.

In accordance with illustrated process block 904, the geographic location data is obtained by accessing geographic location data stored in (i) non-transitory memory of the enterprise server computing system, and/or (ii) an enterprise database, and/or (iii) one or more 3rd party databases.

The computer-implemented method 900 may then proceed to illustrated process block 906, which includes generating and applying, by the enterprise server computing system, a virtual 2D geofence around each TL based on the threshold distance value.

The computer-implemented method 900 may then proceed to illustrated process block 908, which includes capturing or acquiring, by the enterprise server computing system, profile data that includes residential address data and occupational attribute data of members of a TPG for the event.

In accordance with illustrated process block 908, the TPG may comprise members of a specific class of persons based on one or more occupational attributes that include, but is not limited to, occupation title, occupational skills, education, professional experience, department within the enterprise, professional publications authored/co-authored by the member, etc.

In accordance with illustrated process block 908, the TPG may comprise stakeholders of the enterprise (e.g., employees, board members, etc.).

In accordance with illustrated process block 908, the profile data comprises private profile data, i.e., profile data that is not available to the general public at-large.

In accordance with illustrated process block 908, the profile data comprises public profile data, i.e., profile data that is available to the general public at-large.

In accordance with illustrated process block 908, the profile data comprises contact data (e.g., phone number, mobile number, professional email address, etc.), calendar data, scheduling data, educational data, professional experience data, and professional title data of each member of the TPG.

In accordance with illustrated process block 908, the residential address data and/or the profile data is captured or acquired from one or more sources (e.g., non-transitory memory of the enterprise server computing system, and/or an enterprise database, and/or one or more 3rd party databases).

The computer-implemented method 900 may then proceed to illustrated process block 910, which includes automatically executing, by the enterprise server computing system, conversion of the captured residential address data to GPS coordinates (expressed by longitude and latitude).

The computer-implemented method 900 may then proceed to illustrated process block 912, which includes applying, by a rule engine module (e.g., rule engine module 224) of the enterprise server computing system in response to executing the conversion, a geographic location filtering rule to identify members of the TPG having a geographic location that is within the boundaries of the virtual 2D geofence.

The computer-implemented method 900 may then proceed to illustrated process block 914, which includes applying, by the rule engine module 224 of the enterprise server computing system in response to applying the geographic location filtering rule, an occupation filtering rule to identify members of the TPG having one or more predefined occupational attributes.

In accordance with the computer-implemented method 900, the geographic location filtering rule and the occupation filtering rule may be executed concurrently (i.e., in parallel).

In accordance with illustrated process block 914, the occupation filtering rule may be applied to identify members of the TPG having professional experience in a specific area. The specific area could form, at least partially, the subject matter to be discussed at the event.

In accordance with illustrated process block 914, the occupation filtering rule may be applied to identify members of the TPG having a specific professional title (e.g., executive-level title).

The computer-implemented method 900 may then proceed to illustrated process block 916, which includes generating and displaying, by the enterprise server computing system in response to executing the geographic location filtering, a report listing the identified members of the TPG for each TL on the UI of the enterprise client device.

The computer-implemented method 900 may then proceed to illustrated process block 918, which includes generating and transmitting, by the enterprise server computing system in response to executing the profile filtering, an electronic notification of the event to client devices of members of the identified TPG.

In accordance with illustrated process block 918, the electronic notification comprises one or more of a text message, an instant message to a social media account, an email, a calendar invite, and a pop-up notification.

In accordance with illustrated process block 918, under circumstances in which there are two or more TL that are being considered to host the event, the electronic notification of the event is transmitted to members of the TPG that reside in the TL having the greatest population density of TPG having the specific profile.

As illustrated in FIG. 10, illustrated process block 1002 includes generating and displaying, via an interactive GUI module (e.g., GUI module 225) of an enterprise server computing system (e.g., enterprise server computing system 200), an interactive GUI on a user interface of an enterprise client device (e.g., enterprise client device 100).

In accordance with illustrated process block 1002, the enterprise client device may be an authenticated enterprise client device having been authenticated via an authentication protocol implemented by a user authentication module (e.g., user authentication module 222) of the enterprise server computing system.

The computer-implemented method 1000 may then proceed to illustrated process block 1004, which includes capturing, by an enterprise server computing system (e.g., enterprise server computing system 200), input setting data from the enterprise client device and then automatically obtaining, by the enterprise server computing system, geographic location data (e.g., GPS coordinates expressed by longitude and latitude) for each TL.

In accordance with illustrated process block 1004, the input setting data comprises one or more target locations (TL) (e.g., zip code, city, town, country, state, etc.) to host an event to be scheduled.

In accordance with illustrated process block 1004, the input setting data comprises a threshold distance value representing a distance from the TL.

In accordance with illustrated process block 1004, the threshold distance value can be a numeric value expressed in miles or km (e.g., 5 miles, 10 miles, 15 miles, 50 miles, etc.).

In accordance with illustrated process block 1004, the geographic location data is obtained by accessing geographic location data stored in (i) non-transitory memory of the enterprise server computing system, and/or (ii) an enterprise database, and/or (iii) one or more 3rd party databases.

The computer-implemented method 1000 may then proceed to illustrated process block 1006, which includes generating and displaying, via the interactive GUI module of the enterprise server computing system, an interactive virtual 2D map of the TL on the UI of the enterprise client device.

In accordance with illustrated process block 1006, generating the interactive virtual 2D map comprises generating and displaying a virtual 2D geofence around the TL based on the captured threshold distance value.

The computer-implemented method 1000 may then proceed to illustrated process block 1008, which includes capturing or acquiring, by the enterprise server computing system, profile data that includes residential address data and occupational attribute data of members of a TPG for the event.

In accordance with illustrated process block 1008, the TPG may comprise members of a specific class of persons based on one or more occupational attributes that include, but is not limited to, occupation title, occupational skills, education, professional experience, department within the enterprise, professional publications authored/co-authored by the member, etc.

In accordance with illustrated process block 1008, the TPG may comprise stakeholders of the enterprise (e.g., employees, board members, etc.).

In accordance with illustrated process block 1008, the profile data comprises private profile data, i.e., profile data that is not available to the general public at-large.

In accordance with illustrated process block 1008, the profile data comprises public profile data, i.e., profile data that is available to the general public at-large.

In accordance with illustrated process block 1008, the profile data comprises contact data (e.g., phone number, mobile number, professional email address, etc.), educational data, occupational experience data, and occupational title data of each member of the TPG.

In accordance with illustrated process block 1008, the residential address data and/or the profile data is captured or acquired from one or more sources (e.g., non-transitory memory of the enterprise server computing system, and/or an enterprise database, and/or one or more 3rd party databases).

The computer-implemented method 1000 may then proceed to illustrated process block 1010, which includes automatically executing, by the enterprise server computing system, conversion of the captured residential address data to GPS coordinates (expressed by longitude and latitude).

The computer-implemented method 1000 may then proceed to illustrated process block 1012, which includes applying, by a rule engine module (e.g., rule engine module 224) of the enterprise server computing system in response to executing the conversion, a geographic location filtering rule and an occupation filtering rule to identify members of the TPG having a geographic location that is within the boundaries of the virtual 2D geofence and who also have one or more predefined occupational attributes (e.g., that correspond to one or more event topics evidenced by the captured keyword(s)).

The computer-implemented method 1000 may then proceed to illustrated process block 1014, which includes updating the interactive virtual 2D map of the TL to include location tags representing the geographic locations of the identified members of the TPG.

In accordance with illustrated process block 1014, the occupation filtering rule may be applied to identify members of the TPG having professional experience in a specific area. The specific area could form, at least partially, the subject matter to be discussed at the event.

In accordance with illustrated process block 1014, the occupation filtering rule may be applied to identify members of the TPG having a specific professional title (e.g., executive-level title).

The computer-implemented method 1000 may then proceed to illustrated process block 1016, which includes generating and displaying, by the enterprise server computing system in response to executing the geographic location filtering, a report listing the identified members of the TPG on the UI of the enterprise client device.

The computer-implemented method 1000 may then proceed to illustrated process block 1018, which includes generating and transmitting, by the enterprise server computing system in response to executing the profile filtering, an electronic notification of the event to client devices of members of the identified TPG.

In accordance with illustrated process block 1018, the electronic notification comprises one or more of a text message, an instant message to a social media account, an email, a calendar invite, and a pop-up notification.

In accordance with illustrated process block 1018, under circumstances in which there are two or more TL that are being considered to host the event, the electronic notification of the event is transmitted to members of the TPG that reside in the TL having the greatest population density of TPG having the specific profile.

As illustrated in FIG. 11, illustrated process block 1102 includes capturing, by an enterprise server computing system (e.g., enterprise server computing system 200), input setting data, profile data, 3rd party data, and sensor data.

In accordance with illustrated process block 1102, capturing the input setting data comprises automatically storing the captured input setting data and profile data in memory.

In accordance with illustrated process block 1102, the input setting data comprises one or more target locations (TL) (e.g., denoted by one or more of: zip code, city, town, country, and state) to host an event to be scheduled.

In accordance with illustrated process block 1102, the input setting data comprises a threshold distance value representing a distance from the TL.

In accordance with illustrated process block 1102, the threshold distance value can be a numeric value expressed in miles or km (e.g., 5 miles, 10 miles, 15 miles, 50 miles, etc.).

In accordance with illustrated process block 1102, the profile data relates to members of a TPG to serve as event attendees.

In accordance with illustrated process block 1102, the TPG may comprise members of a specific class of persons based on one or more occupational attributes that include, but is not limited to, occupation title, occupational skills, education, professional experience, department within the enterprise, professional publications authored/co-authored by the member, etc.

In accordance with illustrated process block 1102, the TPG may comprise stakeholders of the enterprise (e.g., employees, board members, etc.).

In accordance with illustrated process block 1102, the profile data comprises private profile data, i.e., profile data that is not available to the general public at-large.

In accordance with illustrated process block 1102, the profile data comprises public profile data, i.e., profile data that is available to the general public at-large.

In accordance with illustrated process block 1102, the profile data comprises residential address data of each member of the TPG.

In accordance with illustrated process block 1102, the profile data comprises occupational attribute data of each member of the TPG.

In accordance with illustrated process block 1102, the occupational attribute data comprises one or more occupational attributes, including, but not limited to, occupational title, occupational skills, department within the enterprise, occupational experience, etc.

In accordance with illustrated process block 1102, the 3rd party data comprises geographic location data (e.g., GPS coordinates expressed by longitude and latitude) for the one or more TL.

In accordance with illustrated process block 1102, the geographic location data is obtained by accessing geographic location data stored in (i) non-transitory memory of the enterprise server computing system, and/or (ii) an enterprise database, and/or (iii) one or more 3rd party databases.

In accordance with illustrated process block 1102, the 3rd party data comprises social media data.

The computer-implemented method 1100 may then proceed to illustrated process block 1104, which includes parsing the captured profile data, 3rd party data, and sensor data.

The computer-implemented method 1100 may then proceed to illustrated process block 1106, which includes training one or more ML models based on the captured input setting data and the parsed profile data, 3rd party data, and sensor (to collectively serve as training data).

The computer-implemented method 1100 may then proceed to illustrated process block 1108, which includes deploying a trained first ML model to identify residential address data of members of the TPG and automatically converting the residential data to GPS coordinates.

The computer-implemented method 1100 may then proceed to illustrated process block 1110, which includes deploying a trained 2nd ML model to identify, based on the automatically conversion of the residential data to GPS coordinates, members of the TPG residing within the threshold distance value of the TL.

The computer-implemented method 1100 may then proceed to illustrated process block 1112, which includes generating and displaying an interactive virtual 2D map (e.g., interactive virtual 2D map 2005) of the TL that includes location tags representing the geographic locations of the identified members of the TPG.

The computer-implemented method 1100 may then proceed to illustrated process block 1114, which includes generating and transmitting, by the enterprise server computing system in response to executing the profile filtering, an electronic notification of the event to client devices of members of the identified TPG.

In accordance with illustrated process block 1114, the electronic notification comprises one or more of a text message, an instant message to a social media account, an email, a calendar invite, and a pop-up notification.

As illustrated in FIG. 12, illustrated process block 1202 includes capturing, by an enterprise server computing system (e.g., enterprise server computing system 200), input setting data, profile data, 3rd party data, and sensor data.

In accordance with illustrated process block 1202, capturing the input setting data comprises automatically storing the captured input setting data and profile data in memory.

In accordance with illustrated process block 1202, the input setting data comprises one or more target locations (TL) (e.g., denoted by one or more of: zip code, city, town, country, and state) to host an event to be scheduled.

In accordance with illustrated process block 1202, the input setting data comprises a threshold distance value representing a distance from the TL.

In accordance with illustrated process block 1202, the threshold distance value can be a numeric value expressed in miles or km (e.g., 5 miles, 10 miles, 15 miles, 50 miles, etc.).

In accordance with illustrated process block 1202, the profile data relates to members of a TPG to serve as event attendees.

In accordance with illustrated process block 1202, the TPG may comprise members of a specific class of persons based on one or more occupational attributes that include, but is not limited to, occupation title, occupational skills, education, professional experience, department within the enterprise, professional publications authored/co-authored by the member, etc.

In accordance with illustrated process block 1202, the TPG may comprise stakeholders of the enterprise (e.g., employees, board members, etc.).

In accordance with illustrated process block 1202, the profile data comprises private profile data, i.e., profile data that is not available to the general public at-large.

In accordance with illustrated process block 1202, the profile data comprises public profile data, i.e., profile data that is available to the general public at-large.

In accordance with illustrated process block 1202, the profile data comprises residential address data of each member of the TPG.

In accordance with illustrated process block 1202, the profile data comprises occupational attribute data of each member of the TPG.

In accordance with illustrated process block 1202, the occupational attribute data comprises one or more occupational attributes, including, but not limited to, occupational title, occupational skills, department within the enterprise, occupational experience, etc.

In accordance with illustrated process block 1202, the 3rd party data comprises geographic location data (e.g., GPS coordinates expressed by longitude and latitude) for the one or more TL.

In accordance with illustrated process block 1202, the geographic location data is obtained by accessing geographic location data stored in (i) non-transitory memory of the enterprise server computing system, and/or (ii) an enterprise database, and/or (iii) one or more 3rd party databases.

The computer-implemented method 1200 may then proceed to illustrated process block 1204, which includes parsing the captured profile data, 3rd party data, and sensor data.

The computer-implemented method 1200 may then proceed to illustrated process block 1206, which includes training one or more ML models based on the captured input setting data and the parsed profile data, 3rd party data, and sensor (to collectively serve as training data).

The computer-implemented method 1200 may then proceed to illustrated process block 1208, which includes deploying a trained first ML model to identify residential address data of members of the TPG and automatically converting the residential data to GPS coordinates.

The computer-implemented method 1200 may then proceed to illustrated process block 1210, which includes deploying a trained second ML model to identify occupational attribute data of members of the TPG.

The computer-implemented method 1200 may then proceed to illustrated process block 1212, which includes deploying a trained third ML model to classify members of the TPG based on the identify occupational attribute data.

The computer-implemented method 1200 may then proceed to illustrated process block 1214, which includes deploying a trained fourth ML model to identify, in response to the automatic conversion of the residential data to GPS coordinates, members of the TPG residing within the threshold distance value of the TL based on based on the classification.

The computer-implemented method 1200 may then proceed to illustrated process block 1216, which includes generating and displaying an interactive virtual 2D map (e.g., interactive virtual 2D map 2005) of the TL that includes location tags representing the geographic locations of the identified members of the TPG.

The computer-implemented method 1200 may then proceed to illustrated process block 1218, which includes generating and transmitting, by the enterprise server computing system in response to executing the profile filtering, an electronic notification of the event to client devices of members of the identified TPG.

In accordance with illustrated process block 1218, the electronic notification comprises one or more of a text message, an instant message to a social media account, an email, a calendar invite, and a pop-up notification.

As illustrated in FIG. 13, illustrated process block 1302 includes capturing, by an enterprise server computing system (e.g., enterprise server computing system 200), input setting data, profile data, 3rd party data, and sensor data.

In accordance with illustrated process block 1302, capturing the input setting data comprises automatically storing the captured input setting data and profile data in memory.

In accordance with illustrated process block 1302, the input setting data comprises one or more target locations (TL) (e.g., denoted by one or more of: zip code, city, town, country, and state) to host an event to be scheduled.

In accordance with illustrated process block 1302, the input setting data comprises a threshold distance value representing a distance from the TL.

In accordance with illustrated process block 1302, the threshold distance value can be a numeric value expressed in miles or km (e.g., 5 miles, 10 miles, 15 miles, 50 miles, etc.).

In accordance with illustrated process block 1302, the profile data relates to members of a TPG to potentially serve as attendees to the event.

In accordance with illustrated process block 1302, the TPG may comprise members of a specific class of persons based on one or more occupational attributes that include, but is not limited to, occupation title, occupational skills, education, professional experience, department within the enterprise, professional publications authored/co-authored by the member, etc.

In accordance with illustrated process block 1302, the TPG may comprise stakeholders of the enterprise (e.g., employees, board members, etc.).

In accordance with illustrated process block 1302, the profile data comprises private profile data, i.e., profile data that is not available to the general public at-large.

In accordance with illustrated process block 1302, the profile data comprises public profile data, i.e., profile data that is available to the general public at-large.

In accordance with illustrated process block 1302, the profile data comprises residential address data of each member of the TPG.

In accordance with illustrated process block 1302, the profile data comprises occupational attribute data of each member of the TPG.

In accordance with illustrated process block 1302, the occupational attribute data comprises one or more occupational attributes, including, but not limited to, occupational title, occupational skills, department within the enterprise, occupational experience, etc.

In accordance with illustrated process block 1302, the 3rd party data comprises geographic location data (e.g., GPS coordinates expressed by longitude and latitude) for the one or more TL.

In accordance with illustrated process block 1302, the geographic location data is obtained by accessing geographic location data stored in (i) non-transitory memory of the enterprise server computing system, and/or (ii) an enterprise database, and/or (iii) one or more 3rd party databases.

The computer-implemented method 1300 may then proceed to illustrated process block 1304, which includes parsing the captured profile data, 3rd party data, and sensor data.

The computer-implemented method 1300 may then proceed to illustrated process block 1306, which includes training one or more ML models based on the captured input setting data and parsed profile data, 3rd party data, and sensor data (to collectively serve as training data).

The computer-implemented method 1300 may then proceed to illustrated process block 1308, which includes deploying a trained first ML model to identify residential address data of members of the TPG and automatically converting the residential data to GPS coordinates.

The computer-implemented method 1300 may then proceed to illustrated process block 1310, which includes deploying, in response to automatically converting the residential data to GPS coordinates, a trained second ML model to estimate the population density of members of the TPG residing within the threshold distance value of the TL.

In accordance with illustrated process block 1310, estimate the population density comprises calculating a population (inclusive of members of the TPG and non-members of the TPG) residing within an area defined by the threshold distance value of the TL.

The computer-implemented method 1300 may then proceed to illustrated process block 1312, which includes generating and displaying an interactive GUI having an interactive virtual 2D map (e.g., interactive virtual 2D map 2005) of the TL with the estimated population density.

As illustrated in FIG. 14, illustrated process block 1402 includes capturing, by an enterprise server computing system (e.g., enterprise server computing system 200), input setting data, profile data, 3rd party data, and sensor data.

In accordance with illustrated process block 1402, capturing the input setting data comprises automatically storing the captured input setting data and profile data in memory.

In accordance with illustrated process block 1402, the input setting data comprises one or more target locations (TL) (e.g., denoted by one or more of: zip code, city, town, country, and state) to host an event to be scheduled.

In accordance with illustrated process block 1402, the input setting data comprises a threshold distance value representing a distance from the TL.

In accordance with illustrated process block 1402, the threshold distance value can be a numeric value expressed in miles or km (e.g., 5 miles, 10 miles, 15 miles, 50 miles, etc.).

In accordance with illustrated process block 1402, the profile data relates to members of a TPG to potentially serve as attendees to the event.

In accordance with illustrated process block 1402, the TPG may comprise members of a specific class of persons based on one or more occupational attributes that include, but is not limited to, occupation title, occupational skills, education, professional experience, department within the enterprise, professional publications authored/co-authored by the member, etc.

In accordance with illustrated process block 1402, the TPG may comprise stakeholders of the enterprise (e.g., employees, board members, etc.).

In accordance with illustrated process block 1402, the profile data comprises private profile data, i.e., profile data that is not available to the general public at-large.

In accordance with illustrated process block 1402, the profile data comprises public profile data, i.e., profile data that is available to the general public at-large.

In accordance with illustrated process block 1402, the profile data comprises residential address data of each member of the TPG.

In accordance with illustrated process block 1402, the profile data comprises occupational attribute data of each member of the TPG.

In accordance with illustrated process block 1402, the occupational attribute data comprises one or more occupational attributes, including, but not limited to, occupational title, occupational skills, department within the enterprise, occupational experience, etc.

In accordance with illustrated process block 1402, the 3rd party data comprises geographic location data (e.g., GPS coordinates expressed by longitude and latitude) for the one or more TL.

In accordance with illustrated process block 1402, the geographic location data is obtained by accessing geographic location data stored in (i) non-transitory memory of the enterprise server computing system, and/or (ii) an enterprise database, and/or (iii) one or more 3rd party databases.

In accordance with illustrated process block 1402, the 3rd party data comprises social media data.

The computer-implemented method 1400 may then proceed to illustrated process block 1404, which includes parsing the captured profile data, 3rd party data, and sensor data.

The computer-implemented method 1400 may then proceed to illustrated process block 1406, which includes training one or more ML models based on the captured input setting data and parsed profile data, 3rd party data, and sensor data (to collectively serve as training data).

The computer-implemented method 1400 may then proceed to illustrated process block 1408, which includes deploying a trained first ML model to generate a score value (e.g., between 1 and 100) for each TL among a plurality of TL to host an event.

In accordance with illustrated process block 1408, the score value is based on one or more predefined event parameters/criteria associated with the TPG.

In accordance with illustrated process block 1408, the one or more predefined event parameters/criteria include the distance of members of the TPG residing within the threshold distance value and/or the occupational attributes of such members. In one example, the event to be scheduled may be catered to members of a specific class of persons based on one or more occupational attributes, such as, but not limited to, occupation title, occupational skills, education, professional experience, department within the enterprise, professional publications authored/co-authored, etc. In particular, the TPG may comprise executive-level stakeholders of the enterprise. Thus, the score value for a TL having twenty members of the TPG having execute-level occupational titles will be greater than the score value of another TL having ten members of the TPG having execute-level occupational titles.

The computer-implemented method 1400 may then proceed to illustrated process block 1410, which includes deploying a trained second ML model to generate a TL ranking of all TL based on the respective score values.

The computer-implemented method 1400 may then proceed to illustrated process block 1412, which includes generating and displaying on a UI of an enterprise client device a report that includes a composite list of TL ranking.

In accordance with one or more embodiments set forth, described, and/or illustrated herein, the enterprise client device 100 and the enterprise server computing system 200 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine.

Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An enterprise computer server system, comprising:
   one or more processors and a non-transitory memory coupled to the one or more processors, the non-transitory memory including a set of instructions of computer-executable program code, which when executed by the one or more processors, cause the one or more processors to:
   obtain Global Positioning System (GPS) coordinates of one or more target locations (TL) to host an event to be scheduled, and a threshold distance value representing a distance from the TL,
   generate and apply a virtual 2D geofence around each TL having boundaries defined by the threshold distance value,
   capture profile data that includes residential address data of members of a target population group (TPG) of participants to the event and automatically execute conversion of the captured residential address data to GPS coordinates,
   apply, in response to automatically executing the conversion, a geographic location filtering rule to identify TPG members having a geographic location that is within the boundaries of the virtual 2D geofence,
   train, using captured occupational attribute data as training data, a classification machine learning (ML) model via a neural network, wherein the occupational attribute data includes occupation title, occupational skills, education, professional experience, and professional publications authored/co-authored,
   determine, via the trained classification ML model based on occupational attribute data of the TPG members, an occupational class of each of the identified TPG members, and
   apply an occupational filtering rule to further identify a subset of the TPG members based on the determined occupational class of each of the TPG members.

2. The enterprise computer server system of claim 1, wherein the set of instructions, which when executed by the one or more processors, cause the one or more processors to generate and display, on a user interface of an enterprise client device in response to applying the geographic location filtering rule, an interactive graphical user interface (GUI) listing the profile data of the identified TPG members.

3. The enterprise computer server system of claim 2, wherein the interactive GUI comprises an interactive virtual 2D map that displays each TL.

4. The enterprise computer server system of claim 3, wherein the interactive virtual 2D map includes location tags representing the geographic locations of the identified TPG members.

5. The enterprise computer server system of claim 1, wherein to apply the geographic location filtering rule comprises causing a rule engine module to apply the geographic location filtering rule to filter the profile data by excluding TPG members having a residential address that is outside of the boundaries of the virtual 2D geofence, and wherein to apply the occupational filtering rule comprises causing the rule engine module to apply the occupational attribute filtering rule to exclude TPG members lacking one or more predefined occupational attributes.

6. The enterprise computer server system of claim 1, wherein the set of instructions, which when executed by the one or more processors, cause the one or more processors to generate and transmit an electronic notification of the event to enterprise client devices of the identified TPG members.

7. The enterprise computer server system of claim 1, wherein the TPG comprise stakeholders of the enterprise.

8. A computer program product comprising at least one non-transitory computer readable medium having with a set of instructions of computer-executable program code, which when executed by one or more processors of an enterprise computer server system, cause the one or more processors to:

obtain Global Positioning System (GPS) coordinates of one or more target locations (TL) to host an event, and a threshold distance value representing a distance from the TL;

generate and apply a virtual 2D geofence around each TL having boundaries defined by the threshold distance value;

capture profile data that includes residential address data of members of a target population group (TPG) and automatically execute conversion of the captured residential address data to GPS coordinates;

apply, in response to automatically executing the conversion, a geographic location filtering rule to identify TPG members having a geographic location that is within the boundaries of the virtual 2D geofence;

train, using captured occupational data as training data, a classification machine learning (ML) model via a neural network, wherein the occupational attribute data includes occupation title, occupational skills, education, professional experience, and professional publications authored/co-authored, determine, via the trained classification ML model based on occupational attribute data of the TPG members, an occupational class of each of the identified TPG members, and apply an occupational filtering rule to further identify a subset of the TPG members based on the determined occupational class of each of the TPG members.

9. The computer program product of claim 8, wherein the set of instructions, which when executed by the one or more processors, cause the one or more processors to generate and display, on a user interface of an enterprise client device in response to applying the geographic location filtering rule, an interactive graphical user interface (GUI) listing the profile data of the identified TPG members.

10. The computer program product of claim 9, wherein the interactive GUI comprises an interactive virtual 2D map that displays each TL.

11. The computer program product of claim 10, wherein the interactive virtual 2D map includes location tags representing the geographic locations of the identified TPG members.

12. The computer program product of claim 8, wherein to apply the geographic location filtering rule comprises causing a rule engine module to apply the geographic location filtering rule to filter the profile data by excluding TPG members having a residential address that is outside of the boundaries of the virtual 2D geofence, and wherein to apply the occupational filtering rule comprises causing the rule engine module to apply the occupational attribute filtering rule to exclude TPG members lacking one or more predefined occupational attributes.

13. The computer program product of claim 8, wherein the set of instructions, which when executed by the one or more processors, cause the one or more processors to generate and transmit an electronic notification of the event to enterprise client devices of the identified TPG members.

14. The computer program product of claim 8, wherein the TPG comprise stakeholders of the enterprise.

15. A computer-implemented method, comprising:

obtaining, by an enterprise server computing system, Global Positioning System (GPS) coordinates of one or more target locations (TL) to host an event, and a threshold distance value representing a distance from the TL;

generating and applying, by the enterprise server computing system, a virtual 2D geofence around each TL having boundaries defined by the threshold distance value;

capturing, by the enterprise server computing system, profile data that includes residential address data of members of a target population group (TPG) and automatically executing conversion of the captured residential address data to GPS coordinates;

applying, by the enterprise server computing system in response to automatically executing the conversion, a geographic location filtering rule to identify TPG members having a geographic location that is within the boundaries of the virtual 2D geofence;

training, using captured occupational data as training data, a classification machine learning (ML) model via a neural network, wherein the occupational attribute data includes occupation title, occupational skills, education, professional experience, and professional publications authored/co-authored, determining, via the trained classification ML model based on occupational attribute data of the TPG members, an occupational class of each of the identified TPG members, and applying an occupational filtering rule to further identify a subset of the TPG members based on the determined occupational class of each of the TPG members.

16. The computer-implemented method of claim 15, further comprising generating and displaying, by the enterprise server computing system on a user interface of an enterprise client device in response to applying the geographic location filtering rule, an interactive graphical user interface (GUI) listing the profile data of the identified TPG members.

17. The computer-implemented method of claim 16, wherein the interactive GUI comprises an interactive virtual 2D map that displays each TL, the interactive virtual 2D map including location tags representing the geographic locations of the identified TPG members.

18. The computer-implemented method of claim 15, wherein applying the geographic location filtering rule comprises causing a rule engine module to apply the geographic location filtering rule to filter the profile data by excluding TPG members having a residential address that is outside of the boundaries of the virtual 2D geofence, and wherein applying the occupational filtering rule comprises causing the rule engine module to apply the occupational attribute filtering rule to exclude TPG members lacking one or more predefined occupational attributes.

19. The computer-implemented method of claim 15, further comprising generating and transmitting an electronic notification of the event to enterprise client devices of the identified TPG members.

20. The computer-implemented method of claim 15, wherein the TPG comprise stakeholders of the enterprise.

\* \* \* \* \*